(12) United States Patent
Gottlieb

(10) Patent No.: US 8,095,429 B1
(45) Date of Patent: Jan. 10, 2012

(54) METHOD AND SYSTEM FOR PROVIDING AN ON-LINE AUCTION

(75) Inventor: Harry N. Gottlieb, Chicago, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 0 days.

(21) Appl. No.: 12/478,615

(22) Filed: Jun. 4, 2009

Related U.S. Application Data

(63) Continuation of application No. 11/113,469, filed on Apr. 25, 2005, now abandoned.

(60) Provisional application No. 60/565,551, filed on Apr. 26, 2004.

(51) Int. Cl.
G06Q 30/00 (2006.01)

(52) U.S. Cl. .................................................. 705/26.3

(58) Field of Classification Search ............... 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 4,789,928 A | 12/1988 | Fujisaki | |
| 5,191,410 A | 3/1993 | McCalley et al. | |
| 5,247,347 A | 9/1993 | Litteral et al. | |
| 5,440,623 A | 8/1995 | Moore et al. | |
| 5,508,731 A | 4/1996 | Kohorn | |
| 5,537,143 A | 7/1996 | Steingold et al. | |
| 5,561,707 A | 10/1996 | Katz | |
| 5,563,937 A | 10/1996 | Bruno et al. | |
| 5,740,240 A | 4/1998 | Jolissaint | |
| 5,774,873 A | 6/1998 | Berent et al. | |
| 5,794,219 A | 8/1998 | Brown | |
| 5,815,551 A | 9/1998 | Katz | |
| 5,818,914 A | 10/1998 | Fujisaki | |
| 5,835,896 A | 11/1998 | Fisher et al. | |
| 5,845,265 A | 12/1998 | Woolston | |
| 5,890,138 A | 3/1999 | Godin et al. | |
| 5,905,975 A | 5/1999 | Ausubel | |
| 6,012,045 A | 1/2000 | Barzilai et al. | |
| 6,058,417 A | 5/2000 | Hess et al. | |
| 6,085,176 A | 7/2000 | Woolston | |

(Continued)

FOREIGN PATENT DOCUMENTS

WO    WO 92/15174    9/1992

(Continued)

OTHER PUBLICATIONS

Pinker et al. "Managing Online Auctions: Current Business and Research Issues", Management Science © 2003 INFORMS vol. 49, No. 11, Nov. 2003, pp. 1457-1484.*

(Continued)

*Primary Examiner* — Naeem Haq

(74) *Attorney, Agent, or Firm* — Brinks Hofer Gilson & Lione

(57) ABSTRACT

Methods and systems for providing an on-line auction are disclosed. Online auctions are popular methods of buying and selling items. Some of these auctions relate to "Dutch Auctions," where the subject of the auction is a plurality of similar items. Other types of auctions are disclosed. The embodiments presented herein can be used in contexts other than auctions. Also, each of the embodiments described herein can be used alone or in combination with one another.

16 Claims, 11 Drawing Sheets

Lot# 1001
10 French Crystal Goblets

U.S. PATENT DOCUMENTS

| | | | |
|---|---|---|---|
| 6,161,099 | A | 12/2000 | Harrington et al. |
| 6,371,855 | B1 | 4/2002 | Gavriloff |
| 6,415,269 | B1 | 7/2002 | Dinwoodie |
| 6,665,649 | B1 | 12/2003 | Megiddo |
| 6,677,858 | B1 | 1/2004 | Faris et al. |
| 7,085,740 | B1 | 8/2006 | Meyers |
| 7,177,832 | B1 | 2/2007 | Semret et al. |
| 7,328,185 | B1 | 2/2008 | Gupta et al. |
| 7,475,034 | B2 * | 1/2009 | Coyne et al. .................... 705/37 |
| 7,729,975 | B2 | 6/2010 | Ausubel et al. |
| 2001/0034697 | A1 | 10/2001 | Kaen |
| 2001/0051910 | A1 | 12/2001 | Snelgrove et al. |
| 2002/0013763 | A1 | 1/2002 | Harris |
| 2002/0032729 | A1 | 3/2002 | Erickson et al. |
| 2002/0049664 | A1 | 4/2002 | Hoffman et al. |
| 2002/0062276 | A1 | 5/2002 | Krueger et al. |
| 2002/0116320 | A1 | 8/2002 | Nassiri |
| 2003/0126061 | A1 | 7/2003 | Brett et al. |
| 2003/0208408 | A1 | 11/2003 | Garg et al. |
| 2003/0229564 | A1 | 12/2003 | Reddi et al. |
| 2004/0044614 | A1 | 3/2004 | Wagner |
| 2004/0110552 | A1 | 6/2004 | Del Prado |
| 2005/0021444 | A1 | 1/2005 | Bauer et al. |
| 2005/0125331 | A1 | 6/2005 | Dinwoodie |
| 2006/0206408 | A1 | 9/2006 | Nassiri |
| 2007/0055578 | A1 | 3/2007 | Ashton |
| 2007/0055606 | A1 | 3/2007 | Ausubel et al. |

FOREIGN PATENT DOCUMENTS

| | | |
|---|---|---|
| WO | WO 97/37315 | 10/1997 |

OTHER PUBLICATIONS

"Building and Running Online Auctions," Dr. Dobb's Journal, pp. 84, 86-88, and 91 (Oct. 1997).

Compact disc of demonstration shown in 2002.

"2002 Conference Program—International Conference on Intelligent User Interfaces," http://www.iuiconf.org/02program.html#closingremarks, 10 pages (2002).

"The Interactive Conversation Interface (ICI)," http://portal.acm.org/citation.cfm?id=502718&jmp=abstract&dl=GUIDE&dl=ACM, 2 pages (2002).

"The Interactive Conversation Interface (ICI): A Proposed Successor to GUI for an Interactive Broadband World," Harry Gottlieb, 1 page (2002).

"About the PARC Forum," http://www.parc.com/events/forum/videoarchive/default.php, 1 page (2002).

Anon, Untitled article, Communications Daily, vol. 14, No. 216, Nov. 8, 1994, 2 pgs.

Welch, M., "Santa's Helper," Boston Globe, third edition, Business section, p. E4, Dec. 25, 1997, 1 pg.

Office Action dated Apr. 16, 2008 regarding U.S. Appl. No. 11/113,469.

Office Action dated Dec. 5, 2008 regarding U.S. Appl. No. 11/113,469.

Office Action dated Apr. 20, 2009 regarding U.S. Appl. No. 11/230,219.

Office Action dated Dec. 31, 2009 regarding U.S. Appl. No. 11/230,219.

* cited by examiner

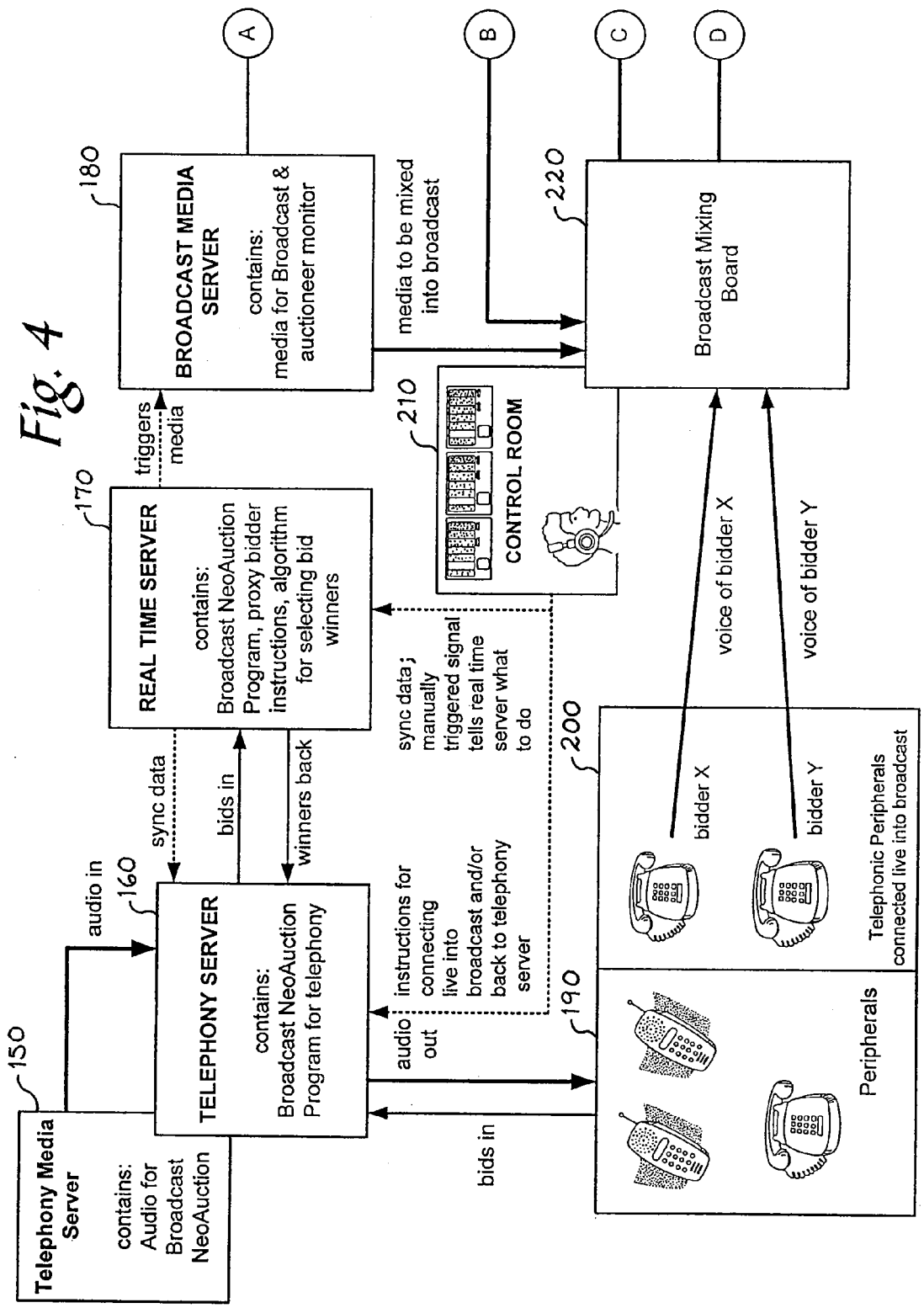

METHOD AND SYSTEM FOR PROVIDING AN ON-LINE AUCTION

CROSS-REFERENCE TO RELATED APPLICATION

This application is a continuation of application Ser. No. 11/113,469, filed Apr. 25, 2005 now abandoned, which claims the benefit of the filing date under 35 U.S.C. §119(e) of Provisional U.S. Application No. 60/565,551, filed Apr. 26, 2004. All of the foregoing applications are hereby incorporated by reference.

BACKGROUND

Online auctions are popular methods of buying and selling items. In general, there are two basic ways in which individuals can place a bid on an auction online: Silent Online Auction or Live Online Auction.

Silent Online Auction

One approach is that of the Silent Online Auction: individuals place bids over a period of days or hours up until an established cut-off time, where the highest bidder at the cut-off is the winner. This approach does not necessarily lead to the seller getting the true market value of his offering: a buyer can abstain from bidding until the last possible moment and "snipe" in a bid. Even if there is another buyer who would have bid higher, such other bidder has run out of time. There are over a dozen software products and services available to facilitate auction sniping.

Some Silent Online Auctions have tried to solve this problem with a variable cut-off time, continually extending the cut-off by a few minutes every time a last-moment bid comes in. This has not proved to be a popular solution. It is often frustrating, for both buyer and seller, to wait for an auction to end, since it is always the case that some minutes have to pass with no bidding.

The other way auction sites have tried to solve the sniping problem is by proxy bidding. The site asks buyers to input their maximum bid and allow the site to automatically increment their bid up to that point ("Proxy bid"). Thus, even if one snipes in a bid, the site could still proxy bid for another buyer who had earlier input a higher maximum.

Both of these approaches to combating sniping, proxy bidding and variable cut-off times, incent buyers to bid their "final" offer early on. This reduces the sense of competition, which is important in creating the excitement of the auction experience, a key component that draws people to auction sites in the first place. Furthermore, it is the competition of an auction that leads to the seller getting the true market value of his offering. In live auctions, we know that the "final" offer in a buyer's mind at the start of the auction may go up during the auction depending on the level of competition. This can happen for at least two reasons: the natural instinct to want to win (bidding, after all, is a type of game where there is a winner) and the buyer recognizing that the item has more value than he had originally expected (since the value is determined by market demand, and each bidder only learns the real market demand after its auction begins).

There are several other problems caused by Proxy Bidding. In the Silent Online Auction, it disadvantages the bidder. If every bidder knew for certain the maximum amount he would bid on an item and that maximum would not be affected by his knowledge of the maximum bids of others, then there would be no disadvantage to proxy bidding on Silent Online Auctions. But this is not the case. Competition in an auction can (and often does) change the value of an item in the buyer's mind. If one bidder (X) has information about the bidding intentions of a competitive bidder (Y), but Y knows nothing about the bidding intentions of X, then X is at a strategic advantage relative to Y: X has time and information that can be used to reconsider his maximum bid if need be, while Y does not.

Thus, proxy bidders in a Silent Online Auction disadvantage themselves relative to those who do not bid by proxy but instead wait to bid until minutes or seconds before the close of an auction. This is because, when two competitive proxy bids are placed, often hours, if not days, before the close of an auction, the system, bids the two competitive proxy bidders against each other instantaneously, until one reaches his maximum bid. There is now one currently highest bidder who has indicated to any other would-be competitive bidders that he is willing to bid to at least a certain amount on the item. Those who are watching the auction but who have not placed bids gain a sense of their competition, while the proxy bidder has no idea who else might bid or what they are thinking. The proxy bidder who finds that his maximum is beat out by another bidder with hours or days left in the competition would be foolish to place another proxy bid if he determines he is willing to pay more. By doing so, he will only push up the price of the item, again giving others time to reconsider. In a way, he is bidding against himself. Wise bidders know this, and this is why there is currently so many software options for sniping.

Proxy bidding also makes it much easier for the seller to safely cheat the bidders. If an item receives a proxy bid with two days left in the competition, the seller can get a friend (a "shill") to place one or a series of higher bids on the item, and, in a matter of minutes, the site will proxy bid for the first buyer and ratchet up the ask price to either the real bidder's maximum or the shill bidder's most-recent bid. Even if the shill ends up with the high bid, there are still two days left in the auction. Other bidders will have time to find the auction and, better yet for the seller, see that there are multiple bidders already, which raises the perceived value of the item.

In another variation on Silent Online Auctions, the bid price starts high and continually goes down until the first person bids, who is then declared the winner. This has also not proved to be popular. It also diminishes competition: no buyer knows anything about his competition since the moment bidding occurs, the auction is over.

Silent Online Auctions have another quality which tends to diminish the sense of competition: the duration of an auction. Typically, Silent Online Auctions take place over the course of days or hours. There is at least one Silent Online Auction where items are available for sale for only one-hour interval. But compared to a Live Auction (online or otherwise) which takes place in a matter of one to five minutes, Silent Online Auctions, from the standpoint of the buyer experience, drag on. Well-trained human auctioneers instill a sense of time pressure in order to increase the sense of competition among bidders. This pressure, which helps lead to the seller getting a higher value for his offering, is nearly absent in Silent Online Auctions, except in the last minute or so when there is a hard cut-off time. It is not surprising to find in many Silent Online Auctions that most of the bidding activity occurs in the last few minutes.

Silent Online Auctions can support a Dutch Auction format. There are at least two variations of Dutch Auctions. The one best known in the United States is the English variation: the seller auctions off multiple items that are identical or at least highly similar in nature (e.g. 100 12-oz. drinking cups, where either all 100 are identical or perhaps 40 are blue and 60 are red). Buyers bid for a certain number of items at a certain price. At the end of the auction (which ends at a set or variable cut-off time), if the total of bids placed seek more items than there are items for sale, then those who have bid the highest prices win, but purchase the item at the bid of the winning bidder who bid the least. In the case of two buyers bidding the same price, the buyer seeking the largest number of items has priority. In a Dutch Online Auction, if one is the lowest winning bidder, but there are not enough items to fully satisfy his order, then such bidder is not bound to purchase. If such bidder declines purchase, the bidder with the next highest priority takes his place. But if there are not enough items to satisfy that bidder's order and that bidder declines, then the process continues. The disadvantage to this approach is that seller (and bidders who have been edged out) may not know the actual results of the auction until after this process has been sorted out.

Today, Dutch Online Auctions take place over a period of time, usually hours or days, not minutes. So, they suffer the same problem of diminishing competition.

The second approach, the Live Online Auction, allows an individual to participate in a live auction being conducted by a human auctioneer in a real-world location, into which an online bidder can signal a desire to bid at a certain price. All bids ultimately are made through and accepted by a human being, an online bid monitor. The human auctioneer may take the bid of someone raising their paddle in the audience, he may take a bid through an online bid monitor, or he may take a bid through a human being who is on the phone with a bidder, a telephone bid taker. If an online bidder bids at a certain ask price sooner, in real time, than a bidder on the auction house floor, because of brief online latencies, the failure of the human online bid monitor or failure of the auctioneer, the bidder from the floor may still win at that ask price. In order to conduct a Live Online Auction, at least three workers must be employed: an auctioneer, an online bid monitor, and a telephone bid taker. If more than one buyer is bidding over the phone, typically one human bid taker is required for each such buyer. It is not unusual to see five or more workers required to conduct an auction.

The relative advantage of an Live Online Auction is that the seller is most likely to get true market value. The auction takes place in a matter of minutes—in real time—continuing only until the auctioneer sees that there are no more bids, at which point the highest bidder wins. This maximizes competition.

Auction sites allow bidders to set up proxy bidding in a Live Online Auction. In a live online auction, those who bid by proxy do not disadvantage themselves as those who proxy bid do in an online silent auction. While the proxy bidder would be strategically advantaged by being present during the auction so that he could make last second reconsiderations of the value of item to him based upon the bidding of others, at least competitive bidders do not know the proxy bidder's intentions ahead of time.

Live Online Auctions cannot support a Dutch Auction format, as a human auctioneer is not able to quickly accept and sort out multiple bids coming in simultaneously from multiple buyers and quickly communicate which bidders have prevailed at a certain ask price before incrementing up to the next ask price. For example, imagine 20 buyers, each bidding for 10 available items, some ordering 6 items, others ordering 4, others ordering 1. After the auctioneer announces an ask price $10 per item, if 8 buyers were to bid at that price, it would require at least a few minutes to determine which buyers had priority. Furthermore, if two bidders both had equal priority but one bid first by a matter of fractions of a second, it would be nearly impossible for the human auctioneer to fairly identify who was the earliest bidder.

DETAILED DESCRIPTION OF THE PRESENTLY PREFERRED EMBODIMENTS

Figure 1A:
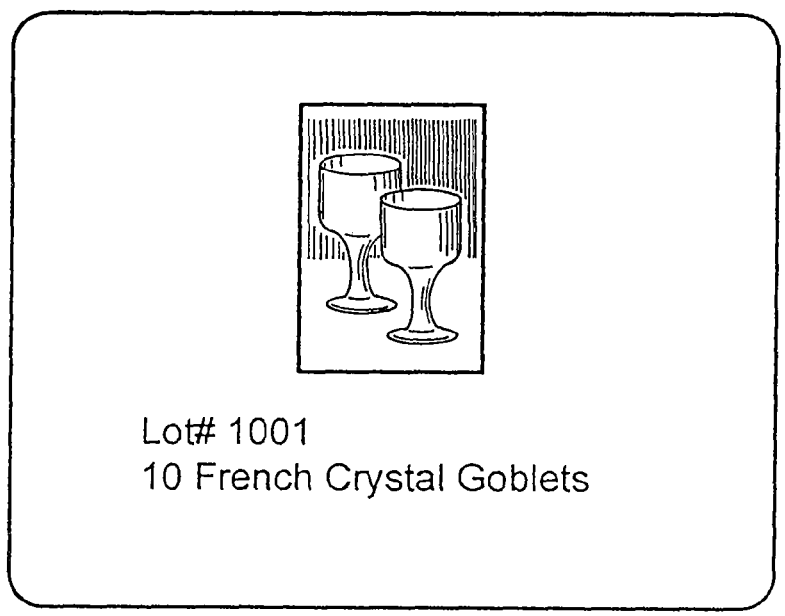
FIGS. 1A-N are illustrations of a preferred embodiment.

The embodiments presented herein relate to methods for providing an auction, although many aspects of these embodiments can be used in other areas. The following paragraph is a general overview of some of these embodiments. Other embodiments are described below, and each of these embodiments can be used alone or in combination with one another.

In one embodiment, a method for providing an auction is described. In this method, at least one processor is provided that is operative to receive bids, preferably all bids, in an auction and to determine a winner of the auction. The auction does not have a scheduled auction end time. As used herein, the phrase "scheduled auction end time" refers to a time on a particular day, established by the time bidding begins on an auction, at which bidding is scheduled to be cut-off. Each time an ask price is raised during the auction, bidders are provided with a period of less than X seconds to bid. "Ask price" is the amount that the auctioneer is inviting the bidders to bid to become the current highest bidder, and "bidding" is a way for a bidder to signal his willingness to buy the item(s) being auctioned. If there are no bids within the period of less than X seconds, the auction ends in Y seconds. If there is a bid within Y seconds, the auction continues. Each time an ask price is raised during the auction, bidders can be provided with the same period of less than X seconds to bid or a different period of less than X seconds to bid. X and Y can be any desired fixed or variable number. For example, X can be 60, and Y can be 0. In at least some of the embodiments, pre-recorded audio plays back during the auction.

General Introduction to the NeoAuction

The following embodiments introduces a third online auction approach referred to herein as a "NeoAuction." In a preferred embodiment, NeoAuctions are "live" in that the bidding takes place in real time (i.e. all bidders only get a few seconds to decide whether to bid higher than the last bidder) and only stops when there are no more bids. However, a NeoAuction is preferably a networked computer Program, typically using audio-visual media and typically requiring no human intervention; the Program acts like the auctioneer. (Although some human intervention can be required, if desired. For example, a human can monitor the auction and press a key before the Program officially declares the item sold. The Program could cue the human with a signal when to press the button. As another example, an electronic impulse from a human heartbeat can be required in order to function.) Bidders can be connected into the Program via the interne, telephone network, or other network.

For the most basic format of a NeoAuction, the Program preferably does the following:

(1) plays pre-recorded audio and/or displays visuals on screen, asking for bids at a certain price ("ask price")
(2) accepts input from multiple buyers for a short period of time (usually less than a minute), allowing each to declare their desire to bid at that ask price (potentially revealing the number of such bidders, if not also their identities) (Silent Online Auction format can accept input from multiple buyers wishing to bid at a certain ask price, but preferably only accepts the first bid it receives and does not reveal the total number of "bid attempts," nor the identity of bidders who made those "bid attempts.")

If there is one or multiple bids at an ask price, then a NeoAuction preferably:

(3) identifies which bidder wins at that ask price (typically, the bid cast the earliest)

(4) communicates to losing bidders, other potential bidders, and those watching that a winning bidder has been selected at the ask price (potentially revealing the identity of such winning bidder)

Otherwise, a NeoAuction preferably:

(5) identifies that no bidders have cast a bid at the ask price within some period of time, where such period is measured from the time that it announced the previous ask price (rather than at some set time of day. Silent Online Auctions have no series of "interim" cut-off times between ask prices, which generate the sense of time pressure and competition. There is a run-around for this definition, however. If (i) there was a fixed amount of time that an ask price is open (e.g. 10 seconds) regardless of number of bid attempts and (ii) the time of the opening bid was set at a specific time of day for the item (e.g. 5:37.00), then one could either measure the period relative to the time of the opening bid (offer another ask price 1:20 after the opening bid) or the time of day (e.g. offer another ask price at 5:38.20).).

(6) ends the auction and declares the highest bidder the winner, communicating this to all other bidders and others watching.

Note also:

(7) Registration: A NeoAuction, like any online auction, preferably requires each bidder to register ahead of time. The registration would normally require identifying information about the bidder (e.g. name, address, phone, email) and perhaps might require a credit card number to confirm the accuracy of the individual's identity, if not also to help guarantee payment in the case that the bidder wins an auction. The registered bidder would then be given (or be asked to give) a password or some other unique identifying information so that when the auction begins, he can enter this unique identifier into whatever peripheral device from which he is bidding (computer, telephone, PDA, etc.) and allow the Program to securely connect the bidder to his registration information. The individual with that unique registration would then appear to other bidders as a unique bidder (by means of audio, text, graphic, or iconic representation, for example).

Multi-Media Enhancement of NeoAuction

A NeoAuction can feature text, icons and graphics, animated, or otherwise, with or without synchronized sound effects and/or music, that show:

1. the current ask price on screen
2. a timer indicating the amount of time available to bid at a given ask price
3. representations of some or all of the individuals who are watching the auction, or who could place a bid or have placed a bid (as a proxy buyer or in real-time)
   a. icons, text, or graphics representing bidders (and potentially watchers) in a fixed location on screen during the course of an auction (or a series of auctions)—this serves to use spatial relationships to help participants easily identify competing bidders (as is the case in a standard live auction)
4. who won at a certain ask price
5. who bid, but lost at a certain ask price
6. that the fair warning period has begun
7. that the auction is closed and whether or not the item is SOLD.
8. who was the winning bidder for the auction
9. an image(s) of the item(s) for sale
10. the item's lot number (or item number)
11. the seller of the item
12. whether a reserve has been placed on the item
13. identifying whether the reserve price has been satisfied during or at the conclusion of the auction
14. descriptive information about the item
15. descriptive information about the seller
16. paddle numbers of bidders A NeoAuction can playback a series of pre-recorded audio files that the Program plays in an interactive sequence in order to simulate the role of a human auctioneer in a live auction by:

1. incrementing and announcing the ask price (e.g. "$50!")
2. doing the "prattle" of sounds and words that auctioneers use to generate a sense of urgency (e.g. "Fifty-Fifty-Who's Got Fifty . . . ")
3. thanking or otherwise acknowledging a bidder, identifying him by actual name, screen name, paddle number, or otherwise (e.g. "Thank you bidder 45!")
4. announcing the fair warning period has begun (e.g. "Fair Warning" "Going Once, Going Twice . . . ")
5. announcing that the auction is closed and whether the item is sold (e.g. "Sold!" or "Auction closed. No bidders.")
6. announcing the winner of the auction, identifying him by actual name, screen name, paddle number, or otherwise. (e.g. "Congratulations to paddle number 4567")
7. urging a bidder on who previously placed a bid to bid again
   a. announcing the difference between the last bid and the current ask price ("Come on number 324, it's only $10 more than your last bid . . . ")
   b. a NeoAuction can direct different audio or graphics to play to different bidders simultaneously on their different peripherals. Therefore, at the same (or nearly the same) moment in time during an Auction, two bidders can be urged on simultaneously (e.g. "Come on number 2134, it's only $15 more than your last bid" could be playing for bidder #2134, while bidder 3687 hears and/or sees this: "Come on number 3687, it's only $10 more than your last bid." Meanwhile, all other potential bidders could be hearing this: "Anybody want to bid at $75? Anybody at $75?")
8. promoting the value of or speaking about the item(s) for sale (e.g. "This is a one of kind, folks . . . ")
   a. doing so in the context of the current ask price (e.g. "This a steal at only $75, friends.")
9. adding in a bonus offering during the auction to help stimulate more bidding (e.g. "I'll tell you what, we'll throw in a Mahogony Box worth $50 if the winning bid for the silverware is over $300 . . . ")
10. announcing the name of the item
11. announcing the lot number of the item
12. announcing a description of the item
13. identifying whether a reserve has been placed on the item (e.g. "Ladies and gentleman, there is a reserve price on this item.")
14. identifying whether the reserve price has been satisfied during or at the conclusion of the auction (e.g. "O.K. we're past the reserve . . . Who'll bid $210?")

Peripheral Bidding into NeoAuction

In a NeoAuction, bidding can take place from any kind of peripheral device that can tap into the network on which the Program is running, including but not limited to: a computer, a wireless PDA, an interactive television, or a telephone.

Such peripheral devices can be divided into: those with a sound, those with a screen, those with both. While the preferred implementation would give all bidders an experience that is highly similar, these output limitations necessarily affect the ability to achieve that. However, by announcing the ask prices so that they can be clearly understood over the phone, at approximately the same moment that the ask price shows up on a PDA without sound, at approximately the same moment that both the ask price and audio file announcing it are played on a computer with both sound and picture, bidders on all kinds of different peripheral devices with some method of sending a signal into the network indicating their bid, can bid against each for the same item in real time, such that preferably:

Cross-Peripheral Bidder Representation in Real-Time
Bidders using sound-only devices:
will be represented textually, iconically, or graphically to other bidders who are using devices with screens (and optionally aurally if there is also sound)
will be represented aurally to other bidders who are using sound-only devices
Bidders using devices with screens:
will be represented textually, iconically, or graphically to other bidders who are using devices with screens (and optionally aurally if there is also sound)
will be represented aurally to other bidders who are using sound-only devices Nearly Identical Sound Experience for Sound-Only Devices & Sound+Picture Devices in Real-Time The preferred implementation would feature the same or nearly the same sound experience on, for example, the phone and a computer with speakers, simultaneously—such that bidders on either type of device had most of the same essential information about their competition and the course of the auction. In order to achieve this, the implementation could employ the following characteristics:

---

1. The auctioneer's voice could clearly state the ask price, so it could be easily understood over the phone.
2. There could be sound effects to indicate or a voice that announced the number of simultaneous bidders at a given ask price.
3. Each active bidder could be given a unique "yelp," that is, a short sfx that would play to identify the bidder each time the bidder won at a certain ask price. Alternatively, the user name of the active bidder could be played back as an audio file or text-to-speech. The purpose of this is to allow the individual over the phone to know how often and when a particular bidder has bid.
4. For technical implementation, the Computer Network Server (the server sending sounds, or triggering previously downloaded sound to the computer peripherals), is preferably synchronized to the Telephone Network Server (the server sending sounds to telephone peripherals) unless these were the same server.

---

Testing for Earliest Bid

In a NeoAuction, the Program can accurately determine who bid first by the following mechanism.

Each live human bidder is connected into the auction via a network, by a computer or other peripheral device. Although there may be latencies in the network, each peripheral device can be told to measure "Bid Time." Bid time is the delay between the time the ask price is presented to that individual on that peripheral device and the time that individual presses a button or invokes some other form of input to indicate a willingness to bid on the peripheral device. The device then reports to the network both the bidder id and his bid time. The network can then use that information to determine who really bid first relative to when each bidder saw the bid. This mechanism does depend on a properly working timing mechanism for each peripheral.

In the case of telephone peripherals, these typically do not have built in timing mechanisms. The timing mechanism would have to be on the server end. However, the latencies for the transmission of voice signals or a DTMF tone over a phone network are very tiny and relatively stable; therefore, a very tiny offset could be applied to such bid times to factor out the phone network latency.

Cutting Off Bidding at an Ask Price

In a NeoAuction, for any one ask price, any one, several, or all of these can be true:

the amount of time to bid can be a set duration the amount of time to bid can be determined by an algorithm (Auctioneer's Algorithm) based upon any number of factors, including the number of active bidders that appear to be left, the ask price, the ask price relative to the opening bid price, the bid times, or other factors the amount of time to bid can be randomly selected the amount of time to bid can be based upon a positive offset (pre-set, selected randomly, or by algorithm) from the first (or second, third, etc.) bid received by the server at such ask price, if such a bid comes in.

For example: the ask price is triggered by the Program at time X. If no one bids, the Program will cut off bidding and announce the auction closed at X+10 seconds. However, in this case, a bid (A) comes into the network from a peripheral device at X+2.5 seconds (time Y). At this point, the Program sets a timer that will cut off bidding at this ask price at Y+1.5 seconds. The reason for allowing this 1.5 second offset from the "first" bid A is to compensate for different network latencies among devices. Thus, a bid B could come into the network at X+3.5 seconds. However, by comparing the bid times reported from each peripheral, the Program may find that bidder B, from the time he saw the ask price, had signaled his bid first.

Proxy Bidding Simulated Live

NeoAuctions can support Proxy Bidding, as such:

1. At any point before (or potentially during) a NeoAuction, a buyer enters a maximum bid into the Program.
2. During the auction, the Program automatically bids at various ask price intervals that are at or below the buyer's maximum bid.

The above is a description for any kind of Proxy bidding, however, in the context of a NeoAuction, proxy bidding can preferably do different things.

In a Silent Online Auction, it is immediately apparent if the Program is making proxy bids in behalf of absent bidders. As soon as one places a bid, if the Program has been instructed to make proxy bids for others, it does so instantly, so it can immediately inform the current/real-time bidder, if his bid is already inadequate.

Furthermore, the intentions of the buyers placing proxy bids that lose is revealed well before the auction is over. For example, if the ask price is at $3.00 and the bid increment is $1.00 and proxy bidder A enters a maximum bid of $8.00, then sometime latter proxy bidder B puts in a maximum of $5.00, the ask price jumps up to $7.00 as soon as bidder B enters his maximum. Anyone watching the auction now knows that bidder B's maximum was $5.00. But, since there may be days or hours left in the auction and bidder B may, in fact, decide to bid higher still, bidder B has revealed information helpful to competitors and unhelpful to him.

In a NeoAuction, the Program can place proxy bids in a manner that disguises the fact of their being a proxy bidder as well as the bidder's intentions, by the following mechanisms:

1. The visual representation of the proxy bidder on screen can look identical to any other bidder. Because bids are preferably placed under a tight time constraint, one ask price at a time, there is never a circumstance where, because of proxy bidding, the ask price is immediately ratcheted up several increments, thus revealing the proxy bidders and their maximums instantly.
2. The Program can vary the duration from the time the Program calls out a new ask price and the time it places a proxy bid, simulating the kind of delay of a human being who is considering whether to bid.
3. The Program can elect to not proxy bid at every ask price, simulating a human being who might decide to bid at $5.00, not bid at $6.00, $7.00 and $8.00, but then bid again at $9.00.
4. The Program can elect to do "jump-ahead" bidding (described below), simulating a human being who might decide when the ask price is at $5.00 to bid $15.00 (presumably to gain a psychological advantage).
5. Furthermore, the Program can do #2, #3, and/or #4 above according to an algorithm that is established by the bidder, a "Bidder's Algorithm." For example, a proxy bidder could give instructions to delay any bidding on his behalf until the ask price reaches a certain threshold; or if there is only one other bidder bidding at a certain ask price who is bidding quickly (short bid time), to in turn, bid slowly instead (presumably because there is a perceived psychological advantage).
6. The Program could also have one or more pre-established algorithms (proxy bidding strategies) that either serve as defaults or are selected by the proxy bidder.

Since, in a NeoAuction, multiple bids can come in simultaneously at a given ask price (with, typically, the earliest being the winner), the Program can:

(i) specifically advantage the proxy bidder by making the proxy bid time be equal to 1 millisecond (ii) specifically disadvantage the proxy bidder by always delaying the proxy bid, to give real time bidders more opportunity to jump in ahead (iii) randomly advantage/disadvantage the proxy bidder by delaying his bid time either randomly or by algorithm.

Depending on the goals of the auction site, any of these approaches might be selected. It could be, for example, that a frequent-buyer (someone who has purchased $X in offerings on the site) is given the ability to proxy bid with no bid time delay, while the typical proxy bid is randomly delayed.

Note that bid time delays, while they may be useful in terms of the psychology of competitive bidding, are ultimately most meaningful in the situation where the bidding is down to bidder A and bidder B and BOTH of them are only willing to go up to the same maximum (whether by proxy or live). For example:

| | | |
|---|---|---|
| Bidder A & C | bid at $2 | C wins. |
| Bidder A & B | bid at $3 | A wins |
| Bidder B | bids at $4 | B wins |
| Bidder C | bids at $5 | C wins (C decides this is the most he will bid) |
| Bidder A & B | both bid at $6 | (and for both, this is the most they will bid) |

In this case, bid time matters. Both A & B are willing to purchase the item for $6.00, but only one of them gets to do so. In a Live Online Auction, the human auctioneer imperfectly determines the winner as the one who HE NOTICED bid first.

In a NeoAuction, the Program can preferably determine much more definitively who bid first.

It can manipulate (randomly or definitively) the timing of proxy bids to affect who bid first.

It can also declare a winner based upon criteria other than who bid "first"

It can declare a winner to be first based upon which bid was first received by a central server.

It can assign a weighting to certain bidders over others for any variety of reasons.

It can select randomly among all the winners who bid at the ask price, disregarding bid speed altogether.

NeoAuction Bidding Process

1. For any item in which a buyer is interested in bidding, the buyer logs-into the auction event during which the item is being sold.
   a. If the peripheral is a phone, then the buyer would call a number for NeoAuctions.
   b. If the peripheral is an online computer, PDA, interactive television, or any other peripheral device with a screen, then the buyer would navigate or link to a website, channel, or other network address for NeoAuctions.
2. The buyer is then prompted to punch in an "auction event code" that corresponds to the auction event which he wishes to attend (a code given during registration). It is also possible to skip this step:
   a. Using GPS or similar technology, if the telephone voice Program can locate the individual and find that he is in the auction house where the event is taking place (more on Auction House Coordination below).
   b. If the individual is using a peripheral device (like a phone) made available by the auction house. For example: if the caller ID of a phone is registered with the Program, identifying it as being exclusively used for auctions at a particular auction house. Although it could be any peripheral device that can send a signal to the server identifying itself.
   c. If an auction house itself has a dedicated phone number for its own auction events, so that anyone calling that number is necessarily logging into the auction event currently being conducted by that auction house.
      i. This assumes that the auction house only conducts one auction event at a time. If this were not the case, then the buyer would need to be prompted to identify in which of two or more simultaneous auctions events he is interested in bidding.
3. If necessary, the Program names the auction and/or auction house and/ or other identifying information (e.g. the auction code itself), allowing the caller to confirm that he is logging into the correct auction.
   a. This step could be skipped.
   b. The voice prompt could instead ask the caller to punch the auction code in again to confirm.
   c. The voice prompt could instead ask the caller to confirm whether he punched in the proper code without naming anything.
4. The buyer is asked whether he is in the auction house. It is possible to skip this step:
   a. Using GPS technology (as per b(i) above)
   b. Using a peripheral device supplied by the auction house (as per b(ii) above)
   c. Using a dedicated phone number (as per b(iii) above) such that, the phone number is used not only exclusively with a particular auction house, but is also exclusively used for buyers who are within the auction house (e.g. the phone number is only posted inside the auction house; buyers online would preferably never see the number from their computer)
5. The buyer is then prompted to punch in a password and/or other information (phone number, zip code, etc.) that positively identifies and connects him to this registration.
6. The buyer is then given a paddle number (or reminded of his paddle number if it was given to him during registration - or is permanently assigned to him for any NeoAuctions). It is possible to skip this step:
   a. In a NeoAuction, each buyer does not need a paddle number, since he could be represented using his name, an icon, or a sound, or not be specifically represented to other buyers at all. Regardless of the technique used, the NeoAuction program preferably knows who is bidding, knows when the bid is made, and is able to positively identify the winning bidder to the seller.
7. The buyer is then given the option to hear instructions and rules regarding bidding. It is possible to skip this step:
   a. if it has been identified that the buyer is a frequent bidder who has already heard the rules and instructions earlier that day or some threshold number of times in the recent past.

-continued

8. The buyer is then "tapped" into the auction event and the current bidding activity on whatever item is presently for sale, with the ability to see and/or hear the ask prices, bidding activity, and some or all of the other actions of the NeoAuction on the peripheral device.
   Variations/Additions:
   a. the buyer is first told what item and lot # is currently selling.
   b. if the buyer, at some point after registering, but prior to an item's sale, has indicated to the Program on which items in the auction event catalog he desires to bid, the Program can tell him how many items are left to be sold before his next desired item ("Your next desired item is only 2 lots away.")
      1. The Program can do this regularly
      2. The Program can do this on-demand of the buyer, who indicates his wish to hear an update via some form of input on the peripheral device.
      3. The Program can offer a waiting time frame (if opening bid times are preset) or waiting time estimate ("Your next desired item will be up for sale in approximately 6 minutes.")
      ii. The Program can update him on the number of items yet to be sold for any, each or all of his desired items. ("Your desired item, #437 is 5 lots away, and your other, Item #440, is 8 lots away.")
         1. The Program can do this regularly.
         2. The Program can do this on-demand of the buyer, who indicates his wish to hear an update via some form of input on the peripheral device.
         3. The Program can offer a waiting time frame for such item(s) (if opening bid times are preset) or waiting time estimate(s)
   c. The buyer is told that his desired item is now up for sale, when that is the case.
   d. The buyer is not "tapped" into the current bidding activity until his desired item is up for sale.
      i. He might experience different audio-visual information before then.
   e. The buyer is not "tapped" into the current bidding activity and is not given the ability to see and/or hear the ask prices, bidding activity and some or all of the actions of the NeoAuction on the peripheral device. This functionality could be used when the buyer is in the Auction House, which is displaying all the NeoAuction activity on one or more monitors, thus the bidder only needs a device with which to indicate his bid, not view the auction activity: if NeoAuction bidders are individually represented (with paddle numbers, icons, etc.), then the bidder could see and/or hear on the auction house monitors the incrementing ask prices, if he has won at an ask price, won the sale itself, who else is bidding etc. It is unnecessary for him to get it simultaneously on his peripheral device. Furthermore, as there may be small network latencies which cause the timing of playback to be slightly offset on a peripheral device relative to the auction house monitors, this may be disconcerting.
9. The buyer does some form of input into his peripheral device to indicate a bid after an ask price is announced.
   a. On a telephone, for example, this might mean hitting the # key. Or to help prevent accidental bidding, perhaps it would require hitting the # key and 1 key (which are on either side of keypad, and unlikely to be accidentally hit in a row).
   b. On a PDA, this might mean using a stylus to click on the screen Coordination with Live Bidders within an Auction House Many buyers prefer to go to the auction house to do their bidding. This allows them to see the merchandise in person on which they might bid. It allows them to take the item home the same day. In Live Online Auctions, the auction house will typically show, on a large screen, the same image of the item that online bidders can see on their computer screens at home/work. The human auctioneer works as usual, taking bids from the floor, telephone bid takers, or an online bid monitor. Furthermore, there are typically one or more workers available to register buyers who had not registered ahead of time.

Auction House Bidding—Peripherals Only

A NeoAuction allows an auction house to run an auction with none of the normal workers. In one embodiment, the auction house would have the following:

1. One or several screens connected by network to the NeoAuction program upon which bidders can easily view the auction activity.
2. A sound system that would play the audio of the NeoAuction.
3. One or several screens connected by network to the NeoAuction program that have opened a window that is synchronized with whatever auction is currently open for bid, but rather than showing all the bidding activity, the screen space is used primarily for showing one or more images of the item, potentially along with identifying information (e.g. name and lot number). The purpose here is to give each "in-house" bidder (who is not sitting 18 inches in front of a monitor as online bidders might be) a better view of the item for sale, since seeing the "object of desire" may positively impact their willingness to raise their bids (it could also do the opposite, of course). Regardless, a large, easy to see image of the object, will be appreciated by bidders.
4. Each bidder is preferably registered to bid in the auction, as usual. There would be computer terminals for self-registration available for bidders who walked into the auction house without having registered ahead of time.
5. Anyone wishing to bid on an item could simply do so over his own cell phone, or over a phone (cell or land) provided by the auction house for the use of its buyers, or by any other peripheral from which one could normally enter bids during a NeoAuction. This would work as described under the section: NeoAuction Bidding Process.

Auction House Bidding—With Bid Spotter

Rather than using a peripheral, some buyers may prefer to bid as they usually do on the Auction Floor—raising their paddle or otherwise indicating their bid to a human bidspotter or auctioneer. Let us call this "paddle bidding." A NeoAuction can accommodate paddle bidding utilizing the following approach:

1. same as above.
2. same as above
3. same as above
4. Buyers wishing to paddle bid would preferably be given, by registration personnel, a physical paddle with a unique paddle number linked to their registration. A physical paddle can be a slip of paper, cardboard, or any other placard that clearly shows the paddle number. Registration itself could be done without a computer, if desired.
5. A bid spotter from the auction house logs into the NeoAuction, using a computer or other peripheral device. The bidspotter preferably needs a special password to log-in, which identifies her to the NeoAuction program as a bid spotter on the auction floor.
   a. There could be one or more bid spotters logged in simultaneously, if there are a very large number of bidders on the floor.
6. During each sale, the bid spotter - sitting in front of all of the paddle bidders, can watch for bid signals and, via some form of quick input on the peripheral (e.g. a button press), enter bids from buyers on the floor - with up to one bidder per ask price. It would be the job of the bid spotter, like that of an auctioneer, to identify to the paddle bidders present whose bid she spotted and entered if there were multiple simultaneous bidders on the floor.
7. The NeoAuction program would integrate such paddle bids from the bid spotter with other bids from other peripherals. That is, if there were multiple simultaneous bids (e.g. one from the floor, one online, one over the phone) the NeoAuction would determine which bid wins at that ask price, based upon whatever criteria is in place to do so.
   a. In the case of paddle bids from an auction floor bid spotter, criteria could be included to relatively advantage or disadvantage such bids relative to bids from other peripherals.
      i. For example, there is a slight delay from the time that a paddle bidder is seen by the bid spotter and the time the -continued the bid spotter enters the bid (as opposed to someone who is bidding directly from a peripheral). Therefore, it may be fair to apply an offset to the bid time of a paddle bid to take into account this delay.
ii. The auction house may, in general, want to provide an advantage to individuals who are physically on the floor - or vice-versa.
b. If there are multiple bid spotters logged-in, then the Program would consider each as a separate bidder, along with all other peripheral bidders.
8. At the close of the auction of each item, if a paddle bidder wins, then the bid spotter would enter the paddle number of that paddle bidder, so that the NeoAuction can keep a complete list of winners, paddle or peripheral.
a. A NeoAuction can give the auction house and/or individual sellers a complete list of winners of items, optionally, linked to registration information.

Peripheral Outbound Alert

Telephone bid takers on an auction floor will call a buyer at a pre-established number when the item they desire is within a few minutes of being on the block. This is helpful since the exact time of the item's sale during an auction event, usually, is not fixed. It allows the buyer to be anywhere with access to a phone and still participate.

Telephone

A NeoAuction can provide the same service without the human proxy. A buyer who desires an item he sees in a catalog can register such desire with the Program. When the item is within minutes of being auctioned off, the Program can call the buyer at a pre-established phone number.

The Program can attempt to reach the buyer at several numbers
a. simultaneously
b. in a set order, determined by the buyer
c. in a set order, determined by the Program
d. in a randomized order The Program would then preferably take the buyer through a log-in process similar to the that described above in "NeoAuction Bidding by Peripheral." Although some steps could be eliminated. The buyer could then bid, as usual.

Another option would allow the buyer to only be alerted by the telephone call that the auction was about to take place, but not allow bidding, if the buyer preferred to be on a different type of peripheral to do his bidding. This could also be helpful for paddle bidders who might be elsewhere in the auction house away from the auction floor or nearby at a restaurant, etc. It could alert them to return to the auction house floor.

The Program could offer a choice of alert times (e.g. call me 2 minutes ahead of time, 5 minutes, 10 minutes, 15 minutes, etc.)

The Program could have set alert times based upon its knowledge of whether the bidder intends to bid on a peripheral or paddle bid.

Computer, PDA, Interactive Television

A buyer could also indicate a desire to be alerted on a computer, PDA, Interactive Television or other non-telephone peripheral device that could be used for placing NeoAuction Bids.

Depending on the device (for example, on a computer), this might require a small networked application to be installed on the computer's hard drive that can receive signals from the Program.

Auctioneer's Algorithm

A human auctioneer, typically, has discretion to increment the Ask Price as he sees fit during the course of an auction in order to maximize the sale price. The Program can do this as well, according to an algorithm.

For example, let us define an "Increment" as some number of dollars (I). (I) can be fixed throughout an item's sale (e.g. (I)=$15). (I) can change during an item's sale based upon the current ask price (e.g. If between $50-$100, then (I)=$20; If between $101 and $20, then (I)=$25).

A NeoAuction "Auctioneers Algorithm" might call for the following:
1. If there are no bids on the Opening Ask Price, drop Ask Price A Increment(s)
2. If the number of Simultaneous Bidders at the current Ask Price is greater than X, the next Ask Price should go up by B Increment(s).
3. If the number of Simultaneous Bidders at the current Ask Price is less than X, the next Ask Price should go up by C Increment(s).
4. If the number of Simultaneous Bidders at the current Ask Price is less than X AND the fastest Bid Speed of such bidder is greater than W, then the next Ask Price should go up by D Increment(s).
5. If the number of Simultaneous Bidders at the current Ask Price is less than X AND the Ask Price is less than the Expected Sale Price Range (R), then the next Ask Price should go up by E Increment(s).
6. If there are no Bidders at the current Ask Price AND the Ask Price is less than the Expected Sale Price Range (R), then the Ask Price should be dropped by F Increment(s).
7. If there are no Bidders at the current Ask Price AND the winner of the second to last Ask Price has a history of long Bid Times when auctions are starting to close, then wait an additional M seconds before calling for Fair Warning.
8. If there are no Bidders at the current Ask Price AND the winner of the second to last Ask Price has a history of long Bid Times when auctions are starting to close, then extend the Fair Warning period by N seconds.

Datapoints used in conditional logic above include:
Opening Ask Price
Number of Simultaneous Bidders per Ask Price
Bid Speed
Expect Sale Price (or Price Range)

Other datapoints could be used in an "Auctioneer's Algorithm" such as:
Purchase History of the most recent Ask Price winners
in terms of Sale Price (relative to current item)
in terms of Item (and it's similarity to previous items bid upon or won)
Proxy Bidder Maximums
Proxy Bidder Bid Instructions
Reserve Price
Jump Ahead bidding
previously for the same item
in previous auctions, by active bidders for this item Procedures that can be triggered an Auctioneer's Algorithm noted above include:
Drop Ask Price
Increment Next Ask Price
Delay Fair Warning Period
Extend the Length of Fair Warning Period Other procedures that could be triggered by the algorithm include:
Pause auction temporarily & trigger media that promotes item
Pause auction temporarily & trigger media that offers a bonus (e.g. an additional item or something else of value beyond the value of the original item for sale itself) for:
subsequent bidders
the winning bidder Play/show media to recent bidders regarding difference between current ask price and Ask Price of their most recent bid Trigger other kinds of special media to "goad" on the bidders Jump Ahead Bidding Rather than a buyer indicating that he wants to bid at a current Ask Price, he can enter a higher bid and submit it. The NeoAuction can handle this in the following ways:

1. If there have been no bids at the current Ask Price, cut off bidding at the Ask Price, announce the Jump Ahead bid, indicate which buyer did it (and thus who is the current high bidder) and then increment to the next Ask Price above the Jump Ahead bid.
2. If there have been bids at the current Ask Price, either:
    a. cut off bidding anyway, if a winner has not already been declared
    b. allow a winner to be declared and then announce the Jump-Ahead bidder
    c. allow a winner to be declared, announce the next Ask Price but shortly thereafter cut off bidding to declare the Jump-Ahead bidder.
3. The interface for Jump-Ahead bidding might, allow the buyer to set a Jump-Ahead bid price by:
    a. manually entering any bid higher than the current bid
    b. manually entering any bid higher than the current bid above a certain threshold, that is an acceptable increment (for example, on an item that is selling for above $30,000, a bid might need to be in increments of $5,000. Thus a bid of $40,387.90 might be past the threshold for being high enough, but not an acceptable increment.)
    c. clicking arrow(s) on screen or pressing button(s) that automatically increment or select a Jump-Ahead bid from a set of possibilities.

Item Descriptions

The descriptions of Online Auction Items (Live or Silent) typically consist of one or more pictures and a text description. The sale of NeoAuction items can be preceeded by a multimedia description of the item, featuring one or more photographs, graphics, animations, and text which come on and off the screen synchronized with a sound track, featuring a voice describing the items.

A NeoAuction Item Description can be triggered:
from a primarily text-based online catalog of a series of auction items, by a buyer
any time
during set periods of time
just before the item is put on the block to be sold
at some point before the item is put on the block to be sold, optionally with (or followed by) a countdown clock indicating how long (exactly or approximately) before the item will be put on the block A NeoAuction Item Description can be interactive, allowing the buyer to answer questions put forward by the description that will be used to personalized the description to the buyer's interests and questions.

Dutch NeoAuction

A Dutch Auction can be administered that creates the time pressure and excitement of the basic NeoAuction format without requiring human intervention. The Dutch Auction preferably follows the following process:

1. Bidders register as usual.
2. Bidders log-in to the auction event as usual.
3. The Program announces the items for sale and the quantity available.
4. Interested buyers indicate, utilizing an interface appropriate to the peripheral they are using, before bidding:
    ➢ Desired quantity (e.g. 20 or 12 or 1)
    ➢ Acceptable Minimum quantity (e.g. 4 or 12 or 1)
5. The Program puts out an Opening Ask Price, per item.
6. Buyers click a button or otherwise signal their desire to bid on their peripheral
7. The Program automatically (and, preferably, almost instantly) sorts all bidders by Priority:
    a. Bids with the largest Desired Quantities have highest priority.
    b. In the event that two or more bidders have equal Desired Quantities, then the program uses another criteria to establish priority, for example Bid Time, where the fastest bidder has highest priority.
8. The Program automatically (and almost instantly) determines which bidders are winners at the Opening Ask Price:
    a. If the sum of Desired Quantities of the bidders is less than the total number of items available, then all bidders are winners.
    b. If the sum of Desired Quantities of the bidders is greater than the total number of items available, then the Program uses bidders' priority order to automatically (and almost instantly) determine which bidders are winners and will get their Desired Quantities, which bidder will win but for a quantity less than desired, but greater than his Minimum Acceptable (if applicable), and which bidders are losers. This process is called "Automatic Allocation," it works as such:
        a. The Program looks at the bidder of highest priority and allocates his Desired Quantity of items to him, declaring him a winner at that ask price.
        b. The Program then looks at the bidder of next highest priority and automatically allocates:
            If there are enough unallocated items, the Program allocates his Desired Quantity of items to him, declaring him a winner at that ask price.
            If there are not enough unallocated items to satisfy his Desired Quantity, but there are still more than his Minimum Acceptable Quantity, then the Program allocates the remaining items to him, declaring him a winner at that ask price.
            If there are not enough items to satisfy his Minimum Acceptable quantity, the the Program declares him a loser at that Ask Price and allocates no items to him. The bidder, however, maintains his overall priority order in the auction according to bid price/desired quantity/bid time.
        c. If there are unallocated items remaining, the Program then looks at the bidder of next highest priority and automatically allocates, until there are either (i) no unallocated items remaining or (ii) no bidders remaining
9. The Program reveals the winners (and losers) at the Ask Price to all other bidders.
10. The Program increments the next Ask Price.
11. Again, willing buyers signal their bid
12. Again, the Program assigns Priorities to bidders.
13. Again, the process of Automatic Allocation takes place.
    a. This may cause lower priority winners from the previous Ask Price to get "bumped." Because of new bidders at a higher ask price, their priority is no longer high enough to win even their minimum acceptable quantity. However, they maintain their overall priority order in the auction according to bid price/desired quantity/bid time.
        ➢ Note that since bid price is the first factor for establishing overall priority among bidders, if a bidder bids again, then his previous bid at a lower ask price is deleted and only his priority at the higher bid price is maintained. One bidder cannot have more than one bid registered in the priority order.
    b. Once there are existing bidders at a lower Ask Price, however, Automatic Allocation can cause a "resurrection." A resurrection occurs when the Program has finished looking at the bidders at the current ask price and there are items that have become unallocated because at least one previous winner got bumped because his Minimum Acceptable could not be filled and there were no bidders of higher priority to whom they could be allocated. In this case, the program looks at the priority order of previous bidders who had been been losers or bumped, and allocates the items.
14. The Program again reveals the winners (and losers) at the Ask Price to all other bidders, showing who got bumped and who got resurrected, if applicable.
15. The Program increments the next Ask Price.
16. And the process continues until the program reaches an Ask Price and there are no more bidders within a short period of time.
17. The Program announces a Fair Warning Period. If a bid comes in during this period, the bidding process continues. Otherwise:
18. The Program does a Lock-Out and Stand-By Period, to make sure that no bids came in during the Fair Warning Period but were delayed by network latencies. If a bid comes in during this period, the bidding process continues. Otherwise:
19. The Program closes the auction and declares the winners of the items.

The following is an example of automatic allocation:
Item=Glasses
Quantity=10
▶Opening Ask Price $10/item
A bids 7/5
B bids 5/3
C bids 4/4
D bids 2/1
Allocation:
A gets 7
B gets 3
C loses
D loses
Overall Priority Order
A, B, C, D (A and B are current winners)
▶Next Ask Price $15/item
C bids 4/4
E bids 2/2
Allocation
C gets 4
E gets 2
A gets bumped (his min=5, but only 4 left)
B gets 4 (up from 3 because now there are 4 left)
Overall Priority Order:
C, E, A, B, D (C, E, and B are current winners)
▶Next Ask Price $20/item
F bids 9/9
Allocation
F gets 9
C gets bumped (min=4, only 1 left)
E gets bumped (min=2, only 1 left)
A not resurrected (min=5, only 1 left)
B gets bumped (min=3, only 1 left)
D gets resurrected (min=1, 1 left)
Overall Priority Order:
F, C, E, A, B, D (F and D are current winners)

Item Description Tool

While it take little technical sophistication to create a description page for a standard online auction, creating a multimedia Item Description, even using the good multimedia tools available on the market today, may require too much sophistication for a typical auction seller to use it well.

To produce a NeoAuction Item Description, the preferred embodiment would take advantage of a specialized tool just for this purpose. The tool would allow an individual with limited technical skills the ability to script a voice-over description of the item, write text and identify audio-visual media files that that should accompany the description, and apply settings for bringing such text and audio-visual files on and off screen ("visual events") and associating each visual event with a cue. The NeoAuction Item Description tool would then either:

▶integrate a recording function to allow the individual to record their voice-over, assuming they can plug a microphone into their computer or ▶allow the individual to call a telephone number and be cued to (a) punch in a code given by the tool (which preferably is on a networked computer) and (b) record the script over the phone, as if recording a voice message. The completed voice recording would be converted into an audio file, which the tool could then download over the network.

The tool would then show a waveform or other representation of the audio file over time. The user could then place cues into the audio file at moments when predefined visual events should trigger. The interface for this might consist of a series of icons with cue numbers on them (each number representing a visual event). The user can then drag the icons on top of the waveform (or other time-based representation of the audio file).

Alternatively, the tool could ask the user to press a key or click the mouse while the audio file is playing back, and the visual event cues would be inserted, in order, with each key-press or click.

The tool would also give the user a method of previewing their Item Description after the cues had been set.

The tool could also be much more simple. For example, the tool might just a template into which one or more photographs and strings of descriptive text would be slotted. An audio file with the voice-over could be attached, having been recorded in a third party program. The timing, formatting, and lay-out of visual events (both those slotted into the template by the user and graphic elements that are generic (for example, background patterns)) might be fixed. It may also be generally fixed, but allow for certain controls to be set by the user (e.g. background color).

The tool preferably has some or all of the following functions:

Method for selecting one among several standard templates

Field for typing in a voice-over script to describe the item

Fields for text (or references to audio visual media files) that preferably appear on screen during the voice-over alternatively, the ability to highlight text in the voice-over script field for the same purpose ▶associated fields for selecting one among several effects for bringing the text or media on screen ▶associated fields for selecting one among several effects for taking the text or media off screen ▶associated fields for selecting one among several effects for moving or altering the text or media once on screen.

▶associated fields for formatting text

▶associated fields for the speed which the text or media will appear, move or be taken off screen ▶associated fields for establishing the location of where the text or media will appear, move, or be taken off screen Method for associating each on-screen event (e.g. text coming on screen, going off screen) with a cue (numbered or named)

Other functions can include: (1) establishing script, uploading images, etc. online, (2) providing a telephone number to call with a code to punch in, and (3) performing recording over a telephone that will be broadcast as part of item description.

Telephone-Online Synchronization for Voice Recording.

The following can be performed to synchronize the display of a computer screen with input and actions on a telephone: (1) go to network computer program, (2) dial a specified phone number to get an associated voice program, and (3) press DTMF keys on phone or utter voice input to change what is on the computer screen.

This process can be used in other application. For example, one can do an online living will (or property will) and store it over a network so it is accessible in times of emergency. Then, to prove that it is the individual's will, there is a voice recording of the individual reading key sections in their own voice, as well as perhaps answering a highly private and personal question posed in the will that an imposter would unlikely know. The telephone is used for the recording device. Activities on the phone would forward screen prompts for the person to read.

Live Audio-Visual Insert into NeoAuction:

In another alternative, there is provided the ability to have live talent (e.g. the voice talent who has recorded the voice of the auctioneer) watching the progress of an NeoAuction, with the ability to indicate that one or several audio clips soon to play will be pre-empted by a live voice-over, then to record the live voice over and upon indicating that the recording is done (given clip to be pre-empted time may have set limits or minimum requirements)—for the recording to be downloaded to all bidders and watchers and seamlessly replace the "generic" audio that would have otherwise played.

The same concept can pull in the bidder or seller over a telephone—recording them just moments before re-broadcasting the recording over the network and cuing the recording to begin at a set place. Screen of seller and/or bidder might change—automatically shut off sound, clear picture etc. (or jump past load-time actions that everyone else sees and give them the experience of seemingly being live . . . even though it is "tape delayed" so to speak)—to allow them to focus on the telephone exchange that is being recorded.

Additionally, depending on load time, voices recording indicate start and stop, but under covers, recording is being done in smaller chunks. As soon as one chunk is recorded, it is immediately sent out for downloading, while the second chunk is still finishing up recording, and so on. The smaller the chunk, the shorter the "delay" time. Further, there can be a voice-over-IP (VoIP) channel running simultaneously so the interaction really is live. This can take place during the middle sections of the auction, allowing for an open microphone to really customize the experience. Also, to play up the drama of an item, there can be a discussion with the seller in-between auction, the host can ask questions, and calls can be taken from bidders.

Auto-Adjust Bandwidth Requirements

If there is a slow connection, the voice that needs to be downloaded can be dropped altogether or to some extent, and NeoAuction can continue with visuals only or visuals+limited sound. Alternatively, NeoAuction can start out with visuals only or visuals+limited sound and stay that way from beginning.

Method for Participating in a NeoAuction Broadcast in Real Time

The method described above for bidders who are present at an auction house, who wish to bid by a peripheral (such as a phone) can similarly be used to allow people to bid by a peripheral (like a phone) for a NeoAuction that is shown in real time on television (broadcast, cable, or satellite). The viewer can simply watch the NeoAuction being conducted on television.

Log-In

If the bidder wishes to be a bidder on an item or series of items, she calls a number (perhaps provided on the screen) or uses her peripheral and otherwise connects to the appropriate network.

Registration

The bidder may be pre-registered for the NeoAuction by having signed up previously (either over the telephone—with a live operator, an IVR program; over the internet on a website; by mail; or by some other method). In any case, by some method (perhaps including caller ID or other input from the bidder), the bidder connects with her registration. Otherwise, registration may need to take place at that moment over the peripheral device she is on. She may not be pre-registered but simply agrees to have any purchases charged directly to her phone bill. There may also be per-minute charges applied while online or on the phone connected to the NeoAuction. Other approaches for identifying and charging the bidder can be used.

Spotting Oneself On Screen

A bidder is likely to feel even more involved if she can "see" herself symbolically represented on screen. Given the number of bidders who may be logging on all the time, there are a number of approaches for this:

1. Each auction item can have a lengthy introduction, during which time any individuals who are planning on bidding preferably need to log-in. During this introduction, a section of the screen is dedicated to showing the names (usernames) and/or any other information desired of the bidders logging in. The peripheral device can alert the bidder close to and/or at the moment when her name and/or other information appears on screen. That information need only be on screen for a second or so, as long as the peripheral has helped to make sure the bidder was watching when it appeared. There can be multiple places on screen for bidders, so that, for example, 6 bidder names could be shown simultaneously. They could be distinguished, for example by color, or numbered or by location on screen, etc. The peripheral could then say/show something like: "O.K. I'm logging you in. Your name should appear in the red box in the next ten seconds." Then, just before her name will appear, "O.K. here you are . . . " and a sound effect could be played over the peripheral timed to coincide with the appearance of the name. To time the sound effect (and/or voice) properly may require calculation of latencies between the two networks—which would likely require knowledge of whether the bidder is watching television through an over-air broadcast, cable, or satellite (and perhaps other criteria as well). Note that with 6 names appearing on screen every 2 seconds, that if an item introduction lasted for only 3 minutes, as many as 540 bidders could be individually introduced in that period of time.

2. The television broadcast could be segmented by region, so that while the item introduction and auction are the same everywhere, the areas of the screen that show the bidder names and/or other information are specific for a particular geographic area (or some other method of segmentation that can map to individual bidders on peripherals). This way, for example, there could still be six boxes on screen for bidder names, but if the broadcast is segmented into twenty different geographic regions, then in every region where names are appearing every 2 seconds during a 3 minute item introduction, 540 bidders could be individually introduced. This means that among all 20 regions, over 10,000 bidders could be individually introduced (that is, could individually see their name appear on television).

3. Bidders could be introduced as part of a group. The bidder could be told a group name and told "when you see your group name appear on screen, you are officially logged in." This is not quite as individualized, but it might still give a bidder a sense of being "logged into the program."

4. Bidders could appear on screen not during an introduction, but during a period dedicated to just showing bidders joining the auction. This would provide for more television screen real estate to show more bidders simultaneously, if desired. This could also show icons or other graphic representation of bidders located on screen. The screen might be divided in regions. The peripheral device says/shows: "Look in the upper-right hand region, you're about to join the auction . . . stand-by . . . " and then the bidder's icon appears on screen (perhaps with an arrow pointing at it with the bidder's name or other information (such as city) attached). Simultaneously, the peripheral can say/show "There's you!" or play some sound effect.

5. Of course, there could be no representation on screen at all of the bidder, unless s/he is a high bidder or winning bidder (when, in most situations, there would be fewer names to deal with). In a single-item auction, only one at a time. The bidder would feel logged in simply by virtue of the personalized experience over the telephone or PC (or other peripheral) that tells them they are logged in and responds in a manner that is cognizant of the action broadcast on screen.

Bidding

The bidder would use voice input, press keys, or use some other form of input to indicate a bid. If she was the winning bidder at any ask price (or among the winning bidders if it is a Dutch auction), the screen could show her name and/or other representative information or icon. Simultaneously (or instead of this), the peripheral could indicate whether she was the winning bidder at an ask price. In this approach to bidding in a NeoAuction, it may be disadvantageous for the experience delivered over the peripheral to be the same as that delivered over the television, since it is assumed that the bidder is experiencing both simultaneously. There would be an advantage for the experiences to be coordinated, so that one or the other has the bidder's focus at any one moment—so the two experiences are not competing, but form a unified whole in terms of a cognitive experience. Thus, as all bids come in, perhaps the television program's announcer (auctioneer) stops talking and creates a moment for the voice over the telephone (or text on a screen) to take focus and indicate whether or not the bidder has won at the ask price (as well as, if in a Dutch auction, been knocked out). The length of that experience could also be coordinated with the television experience, so that the television announcer only starts talking after the message over the peripheral has been delivered. This may require, in the heart of the system, a Real-Time Data Server that is not only coordinating all of the bids coming in and picking winners, but synchronizing the playback of media/data that will occur over the broadcast television program relative to the playback of media/data over peripherals.

The voice(s) over the telephone or other sound-based peripheral and voice(s) over the television could be the same or different.

Many of the other techniques for a NeoAuction, such as the Auctioneer's algorithm, can be employed; in particular where the auctioneer speaks individually to a bidder, prodding him to bid ("C'mon paddle 47, it's only $30 more than your last bid.") by this synchronized give-and-take between peripheral and television.

At the end of the Auction, either the peripheral, the television, or both could announce/show the final winner/winners of the auction.

Broadcast-to-Interactive Peripheral Give & Take

A broadcast program (whether pre-recorded or live) can be set-up to work with peripherals so that viewers can participate with the program in a manner that has the following quality: the broadcast program and peripheral interactive program are timed so that one "gives focus" to the other at certain moments.

"Gives focus" is a term used in theater. If the director of a play has, for example, a street scene where there is a group of men talking on side of the stage and a group of women talking on the other, when the men's lines are to be delivered, the actresses are likely to be directed to slow down their movements and lower the volume of their voices dramatically while they continue to act as if they are in conversation. Meanwhile, the men are doing the opposite: they raise their voices (so the audience can hear the lines) and may allow their movements to be larger and more obvious. When it is again time to "return" to the women's conversation, the men will "give focus" and the women will "take focus" by reversing the level of their volume and movements. Giving and taking focus can also be enhanced by stage effects such as lighting (e.g. dimming on the actors giving focus, brighter on the actors taking focus) or microphone volume or blocking (e.g. another "crowd" of actors walk in front of and obscure—perhaps with props—the actors giving focus, while the crowd parts to reveal the actors taking focus). Play directors and stage actors have found many creative ways to give and take focus. But the goal is usually, to allow the audience to focus on the part of the stage where the important action is taking place to which they should be paying attention.

This method applies this concept in a far more technically complex circumstance, where the focus giving and taking is between a broadcast television program and an interactive peripheral device that is coordinated with it.

By way of example, in a Dutch auction program, when there may be hundreds of items for sale and just as many highest bidders at any one time, it will probably not make sense to announce the current high bidders at every ask price broadcast on television. There would be too many to name: every time the ask price is raised, one would need to hear or see a list of hundreds of names. It may make more sense to simply let every individual bidder know through their peripheral whether they are "in" (e.g. among the highest bidders) or "out" (e.g. not among the highest bidders).

The following is an example showing the giving-and-taking of focus.

Step 1:
Broadcast TV: (Takes Focus) "$4.50 per item? Who wants to bid $4.50"
Peripheral: (Gives Focus) is silent, or plays non-distracting music, during the announcing of the ask price.
Step 2:
Broadcast TV: (Gives Focus) goes silent or plays non-distracting music (perhaps a countdown), the text "$4.50" stays on screen. There might also be text that reads: "Who wants to bid?"
Peripheral: (Takes Focus) "So, do you want to bid $4.50?"
The caller says something over the telephone/peripheral or hits a key combination to indicate his bid. A sfx or other form of feedback indicates that the bid has been registered.
Step 3:
Broadcast TV: (Takes Focus) "Times Up. O.K. we've got a 138 bidders at $4.50 an item . . . ."
Peripheral: (Gives Focus) is silent
Step 4:
Broadcast TV: (Gives Focus) is silent (or sound is diminished) voice stops talking
Peripheral: (Takes Focus) " . . . and you are IN!"

Step 5:
Broadcast TV: (Takes Focus) "Let's keep going! $4.75 an item!"
Peripheral: (Gives Focus) goes silent.
. . . and so on.

Taking and giving focus can be done in a variety of ways, but the end results is that the audience member knows whether, at any one moment, to pay attention to the media from the peripheral (and potentially respond to it) or pay attention to the broadcast. One could also mirror the audio on the broadcast to the peripheral in part or in its entirety so that, when the "broadcast voice" was speaking, one can hear it simultaneously over the telephone and over the broadcast, but when the focus would shift to the peripheral, the "peripheral voice" would only come over the peripheral. (The "broadcast voice" and "peripheral voice" can be the same actor's (or simulated) voice). This feature, like other features described herein, can be applied to subject matter other than auctions.

Pre-Recorded Broadcast Program

If the broadcast program is pre-recorded, the nature of the program may be such that the media segments it plays back are interactive (which is to say dependent upon) the response to the audience. This does not necessarily mean it is "interactive television." It can be that the same television broadcast is beamed to every home using the same type of TV equipment that has been around for years. However, what is broadcast changes dynamically with input from all audience members in real-time.

There is precedent for this. Television programs will sometimes ask viewers to call in and respond to a poll. The results of the poll are then broadcast to everyone and may even remain on screen and be updated in real-time. This does not involve pre-recorded segments that are triggered based upon the poll results, but rather dynamically generated graphics that are broadcast on top of (or intermixed into) a live broadcast, usually with some human intervention within a control booth that dictates, at a minimum, timing. The auction example, if the television broadcast is pre-recorded, preferably requires an actual branching structure to be used to determine what is on screen based upon the input from audience members over a peripheral. That is: (1) broadcast audience provides input over a peripheral device (2) that input is tabulated, calculated or otherwise processed in real-time and (3) the results of that processing automatically and in real-time, trigger one (or more) pre-recorded media segment(s) rather than other(s) to be broadcast, based upon instructions from one or more conditional statements against which the results are tested. The input process preferably happens multiple times in the course of such broadcast program.

Live Broadcast Program

With a live broadcast program, preferably the same process as described above for a pre-record broadcast program happens, except that the actors are cued by the processor as to when to "give focus" and "take focus." Alternatively, it may be the actors who cue the processor/peripheral media server when to "take/give focus" or a combination thereof (see below for example). The broadcast program can be a mixture of pre-recorded and live, and all of these concepts can be applied to any type of broadcast, including radio.

Method for Participating in a NeoAuction Broadcast in Real Time Using a Live Auctioneer It is difficult to find television programs that do not feature images of human beings, usually talking. Cartoons show anthropomorphic characters talking. Images of people or people-like creatures dominate what we view on TV. Rather than using only pre-recorded sound or text-only, a NeoAuction could certainly use pre-recorded video of an Auctioneer and/or other characters while an Auction is active, or during introductions to items, etc. Of course, if anything truly unusual happens during an auction that had not been anticipated by those who produced the media for it, there may be a lost opportunity for taking advantage of the situation, talking about it, and building upon it in order to make the experience that much more engaging. There are many reasons why television producers, for certain types of shows, continue to produce them live (or live-on-tape). There is a spontaneity and authenticity that comes from such productions that draw audiences. A NeoAuction can take advantage of using live human beings, in particular an auctioneer, to capture some of this excitement when a NeoAuction is broadcast live, as illustrated in the following scenario.

An auctioneer and perhaps another actor or two introduce a new item and talk about its virtues, perhaps showing taped segments about it. As they are speaking, individuals are connecting into the upcoming auction through peripheral devices (like a telephone). The live auctioneer can see on a monitor a count of the number of bidders joining in, as well as their names and other information (perhaps only some names, selected by algorithm or by a human). The auctioneer can report this to the television audience/bidders: "We're going to start this auction in just one more minute. Looks like we've got 452 bidders at this point." Either the auction begins based upon its own pre-established timetable, or a human (perhaps the auctioneer) has the ability to start the auction when desired. The auctioneer sees a monitor (a visual screen or visual indicator, earpiece, tactile device and/or some other mechanism for monitoring) that indicates the opening price. As he says the opening price, a human (perhaps the auctioneer himself) sends input into the system that shows the opening price on screen and officially opens the floor for bidders, bidding at that ask price. The NeoAuction program accepts bids from individuals on all their various peripheral devices and identifies a winner(s) according to an algorithm. It then reveals that winner(s) names and/or other information to the auctioneer (it may simply signal to the Auctioneer that the NeoAuction has selected a winner/winners at the current Ask Price). At this point, the NeoAuction increments the ask price, shows it to the auctioneer on the monitor, who then announces it and breaks into his auctioneer's chant, until again, the NeoAuction program indicates that there is a winner and increments the ask price again.

Of course, at a certain point, there will be no more bidders. The NeoAuction will show the auctioneer that there are no bidders and perhaps for how many seconds the ask price has been available. The NeoAuction monitor might show information to the auctioneer that he can choose to use to prod on bidders (such as the names of the bidders who were most-recently bumped and the difference in price between their last bid and the current ask price). The auctioneer can say or do what he feels appropriate at the moment. When he is ready to close, he can call FAIR WARNING (perhaps hitting a button so that the NeoAuction knows to put the Fair Warning indicator on screen) and then call the auction closed: "Sold!" (again, somehow indicating that no more bids should be accepted. The auction can also require a Lock Out and Stand By period to require latencies, which would be handled a similar way: the auctioneer would, instead of saying "Sold!" (or "No sale" if appropriate), say: "Lock Out and Stand By" (or something similar) and indicate through input to the NeoAuction that it should accept no more bids that, on a peripheral, were time-stamped before that lock-out moment. After waiting a second or so for any bids coming in that were delayed because of network latencies, the NeoAuction indicates to the Auctioneer that he should close the auction. The auctioneer, perhaps, hits a gavel (maybe against an input device into the NeoAuction) and says: "Sold!" The NeoAuction officially closes the auction.

There are several variations that can be used. In one variation, the NeoAuction employs voice recognition technology that listens to the auctioneer's utterances and automatically identifies when the auctioneer has announced the next predetermined ask price. In another variation, the NeoAuction does not determine the ask price; it is determined by the auctioneer in real-time. The NeoAuction can employs voice recognition technology to identify (i) the price the auctioneer is asking for (perhaps putting that price on the screen) and (ii) when the price changes. The Auctioneer (or an assistant) can have a physical input (perhaps keys, a mouse, a joystick that he can use to tell the NeoAuction how and when to increment the price). The Auctioneer (or an assistant) can also have a physical input device that does not increment the ask price but only identifies that the auctioneer has changed the ask price. The ask price is either (a) not put on the screen or (b) put on the screen a little bit later by a more manual operation performed by a human. However in both cases, the NeoAuction knows that a new ask price has been set and it can take bids again and identify the winner or winners.

Summary of Broadcast NeoAuction

The following provides a summary of the broadcast NeoAuction embodiment but is not intended to limit claims directed to this subject matter. The term "bidders" used below refers to bidders or human beings who are bidding on behalf of someone else who will actually pay for and purchase the items, if won. The term "monitor" refers to picture and/or sound.

In summary, the Broadcast NeoAuction is an auction where:

1. Live human auctioneer's voice is broadcast over a network (including the interne, radio, television or interactive television networks).

2. Bidders are able to place bids by computer, telephone or other peripheral device; (either directly or through a bidspotter (i.e., the bidder simply raises a paddle or their hand or otherwise indicates a willingness to bid, while the bidspotter see this and does the job of inputting into the peripheral device)). Such bids are accepted by a processor.

3. During an auction, whenever (i.e., every single time) there are more than X bidders bidding at a particular ask price the processor receives or rejects at least some of the bids.

In a Broadcast NeoAuction, if there are hundreds of people bidding from peripherals there is no way for an auctioneer to accept the bids, except through a processor. However, once the bidding is down to two people (which is nearly always the way it works), the program could actually tie those two people into the broadcast over their phones, so that the home audience could hear their voice. At this point, the auctioneer would not need the NeoAuction technology at all to conclude the auction. This would, in fact, be a highly dramatic way to televise such an event. Even if one did not want to do that, it is possible for the Broadcast NeoAuction to start off by taking bids only from an in-studio audience directly to the auctioneer, and only open the bidding to the home audience after that. Or, there could be some alternating circumstance where the home audience bids on every other bid (with the processor accepting bids), and the in-studio audience the alternate bids where the auctioneer accepts the bids directly. The point is, in a Broadcast NeoAuction, it is not the case, necessarily, that the processor is always accepting and prioritizing every bid. In a Broadcast NeoAuction, the auctioneer might be down to two people and have them bidding against each other over the phone, where the auctioneer is directly accepting the bids. Then, a new bidder makes a bid over the telephone—that is accepted by and comes through the processor—that the auctioneer sees and can assign priority to (i.e. he sees this peripheral bid come through while the person on the phone is thinking and he calls the peripheral bidder the winner). This is so much to say, the bidding may be open to everybody (but realistically there are few bidders left), and the auctioneer can be accepting SOME of the bids. That is, above some threshold number of buyers X (e.g., 100), the processor preferably accepts bids and determines automatically or assist in determining the winning bidder at the ask price.

Additionally or alternatively, the processor can automatically order Y % of such bids according to an algorithm that determines bid priority. Further, either the processor automatically selects the winning bid(s) at such ask price or the auctioneer (or other human in real time), referencing the bid priority order set by the processor, manually selects the winning bid(s) at such ask price. Other alternatives can be used. In one alternative, broadcast/peripheral systems can be used where the peripheral signal sent out by the listener travels through a mechanism that is separate from the mechanism that carries the broadcast signal into the listener. For example, the peripheral signal is bid through a phone (mechanism A) and the broadcast comes over a television (mechanism B). This is not the case for current live online auctions. In those auctions, the broadcast to the listener is through a PC (mechanism A) and the signal sent out by the listener is through a PC (also mechanism A). In another alternative, a Dutch NeoAuction is provided with a live auctioneer assisted by a processor, where bidding is entirely by peripherals. In yet another alternative, entry to NeoAuctions can be limited to a fixed number of people and "reward programs" can be provided that gain one access. For example, if one buys $X in merchandise through NeoAuctions, it gives them priority for getting into future auctions where there are a limited number of bidders allowed.

Description of Appendices

Appendices A-D contain descriptions of presently preferred embodiments. Appendix A ("NeoAuctionOne") describes a demonstration in which, before bidding begins, users can see a detailed description of the item up for auction along with the seller and opening bid information. Once the auction starts, the user is represented by a green ball in the lower right-hand corner, while other bidders are represented by a series of white balls. The opening bid appears on the screen and the bidding is now open. Users can place a bid by clicking on their numbered icon. Using time stamps the moment bids are placed, the fastest bid is determined and the fastest bidder is recognized. Once a bid is recognized, the bid amount increases and users are again able to place their bids. Once a user's bid is accepted, they are unable to bid again until they are outbid by another user. On occasion, the host will challenge a user to see if they wish to stay in the running for an item. Once the seller's reserve price is met, an indicator appears onscreen in the upper left-hand corner. The seller can offer incentives during the auction to keep the bidding active. When the allotted bid time expires, the host begins the "fair warning" period to close out the auction. During the "fair warning" period, bids can still be accepted. This can re-open the bidding phase of the auction. The bidding continues until the allotted bid time expires once again. Once the allotted bid time expires, the auction again enters the "fair warning" period. If no new bids are placed, "fair warning" continues. At the end of the "fair warning" period, the auction enters the "lockout and standby" phase as the auction is finalized. At the end of the "lockout and standby" period, the auction is completed and the highest bidder is declared the winner of the item. If the winning bidder and the seller are both online at the end of the auction, the host can connect them in a private chatroom to finalize the payment/shipment details.

Appendix B ("NeoAuctionTwo-LayOutBidders") describes how more and more bidders can be added on screen, scaling the size of their icons but still creating a sense of where everybody is. Appendix C ("NeoAuctionOne-Item Description") describes a demonstration of how an item's description can be presented, and Appendix D ("NeoAuctionTwo") describes another auction demonstration.

Lastly, Appendices E and F contain sample scripts for the auction of a single item and a Dutch auction, respectively. The "indicators" mentioned in the sample scripts give the individual bidder information about whether his bid was accepted, his bid time relative to winning bidders, etc.

Drawings

Figure 1B:
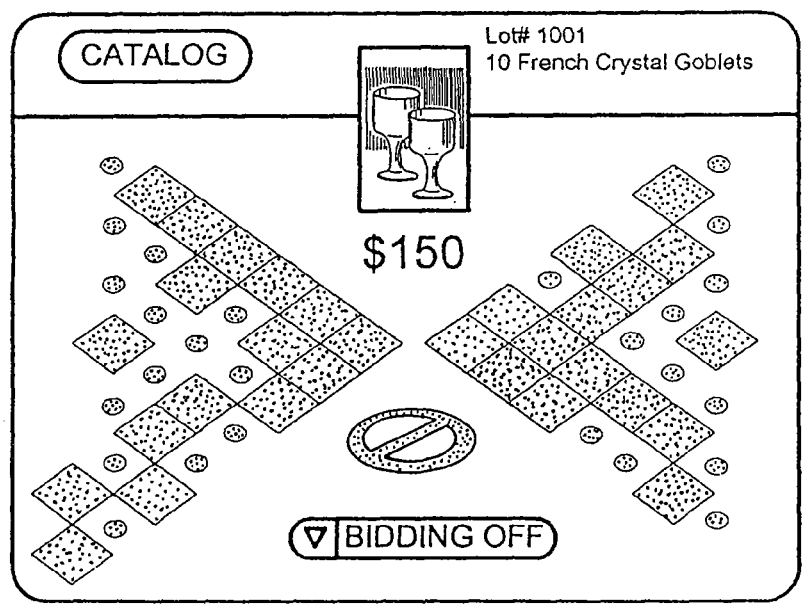
Figure 1C:
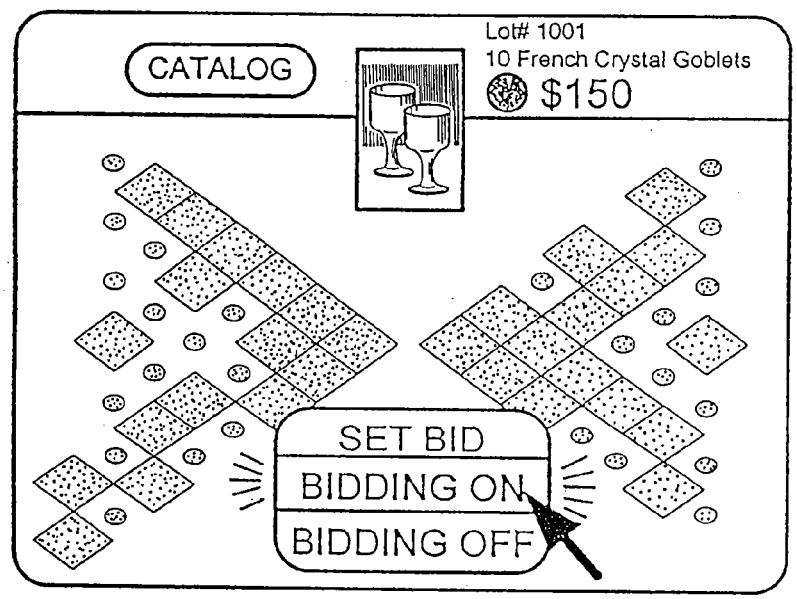
Figure 1D:
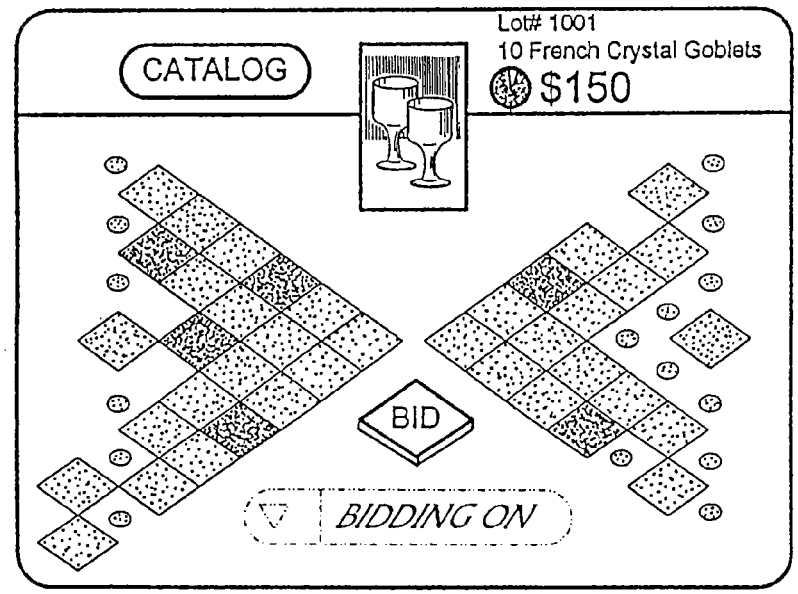
Figure 1E:
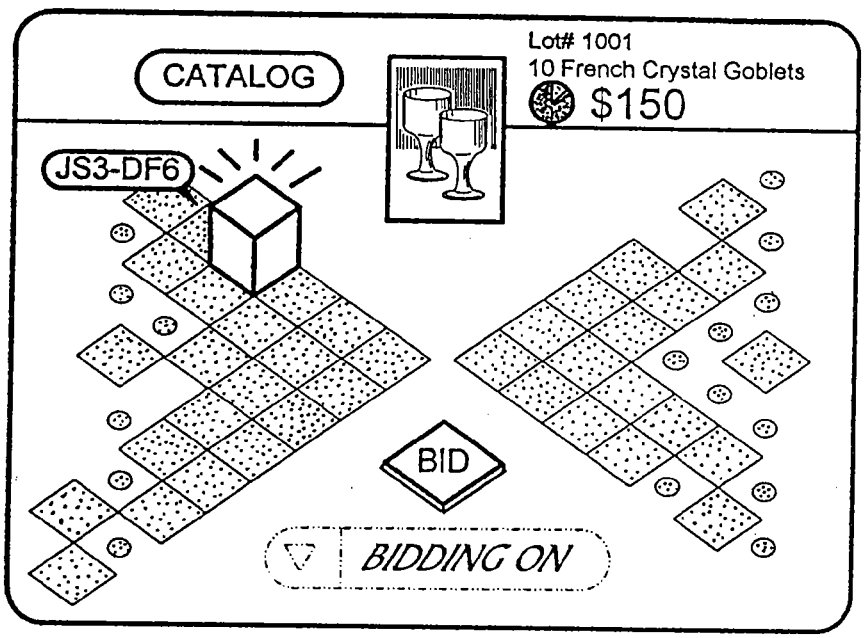
Figure 1F:
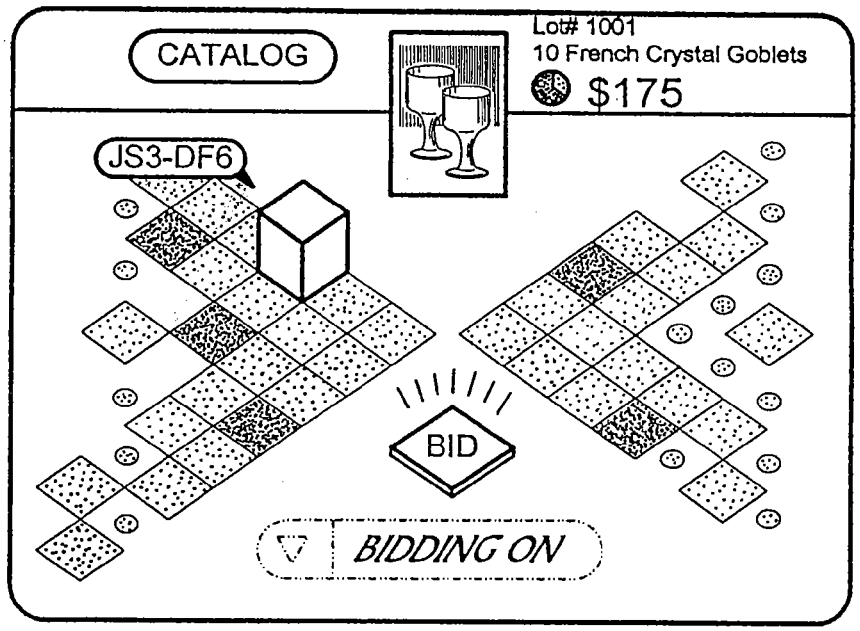
Figure 1G:
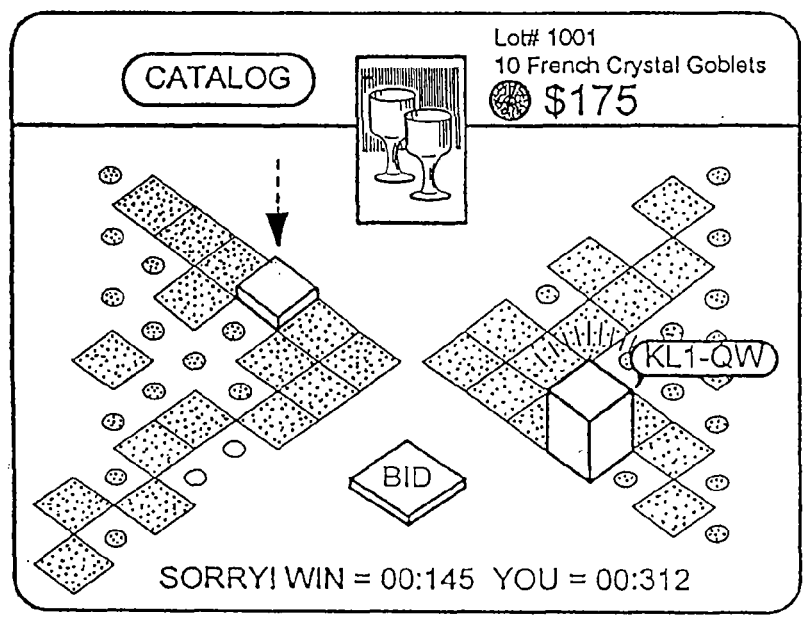
Figure 1H:
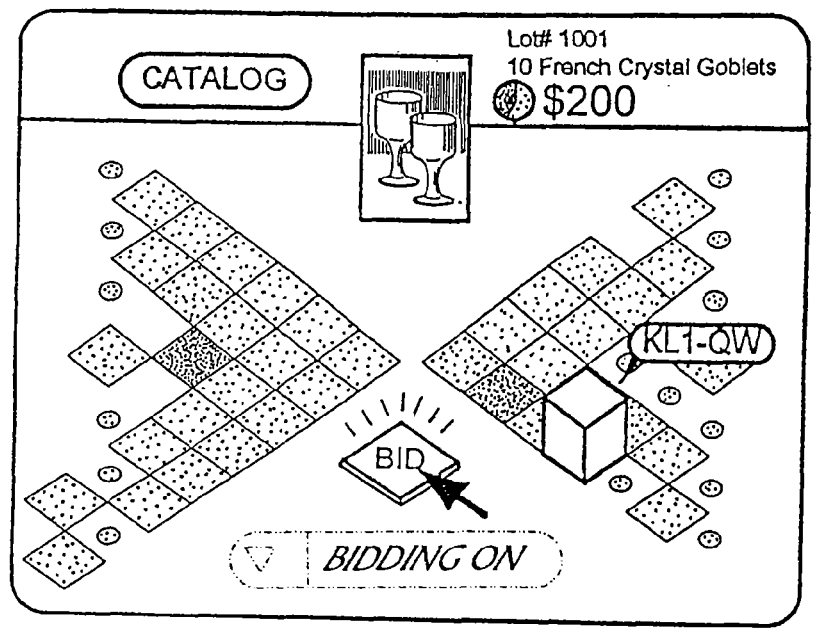
Figure 1I:
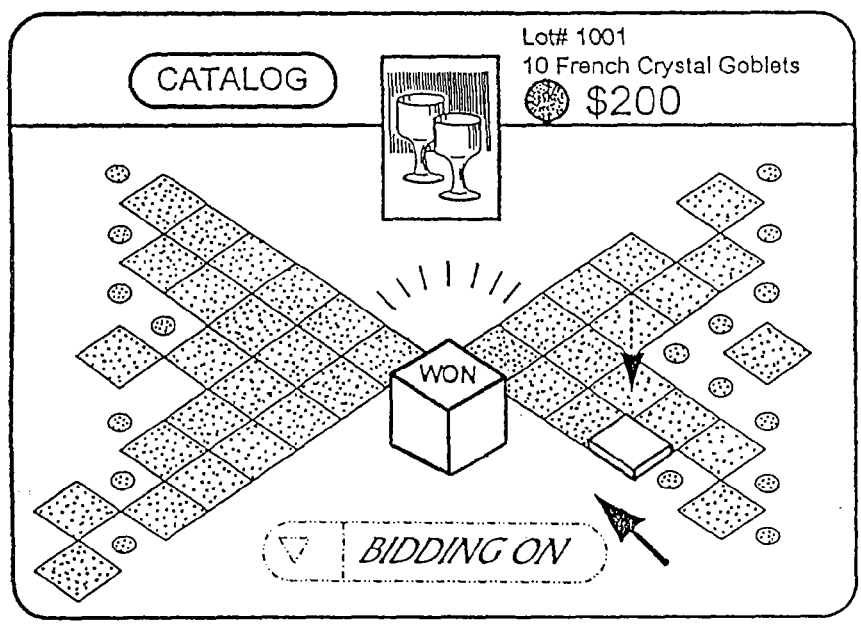
Figure 1J:
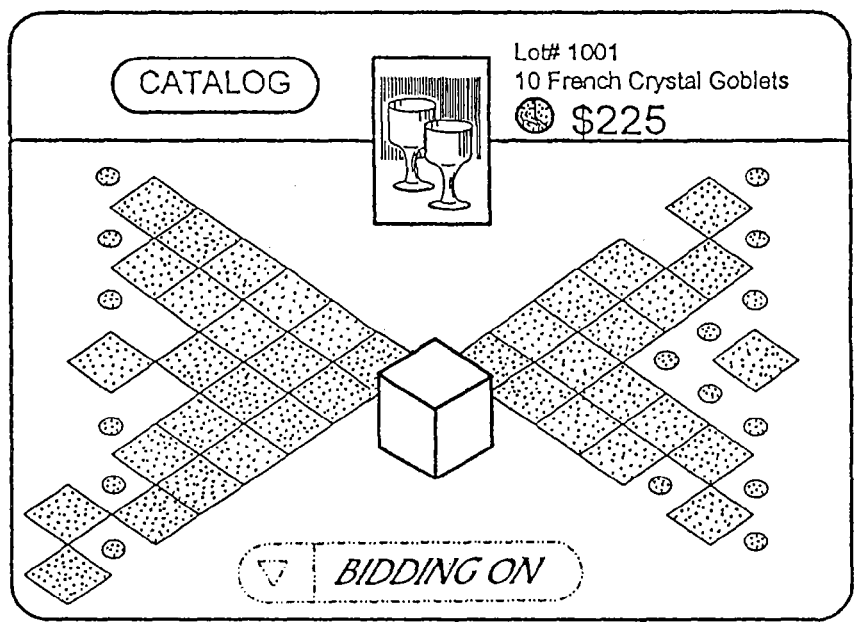
Figure 1K:
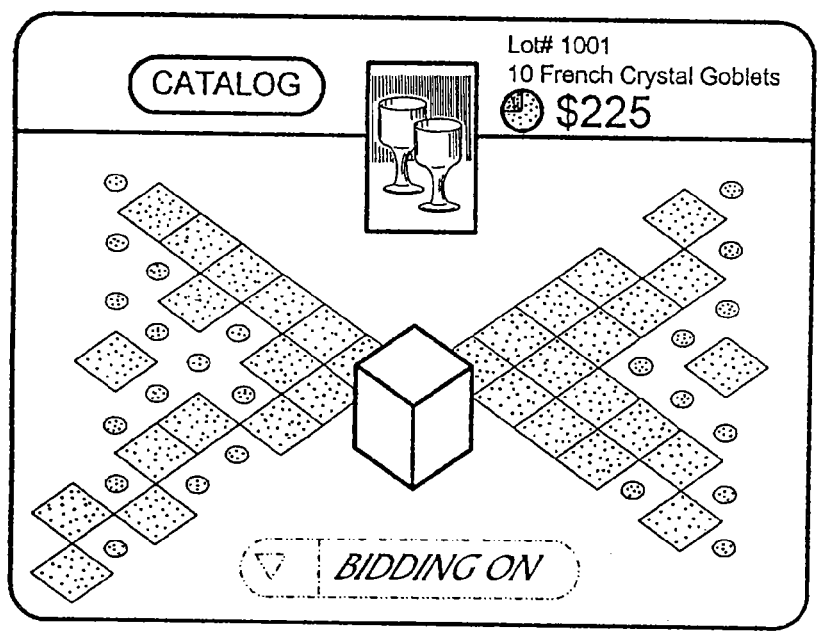
Figure 1L:
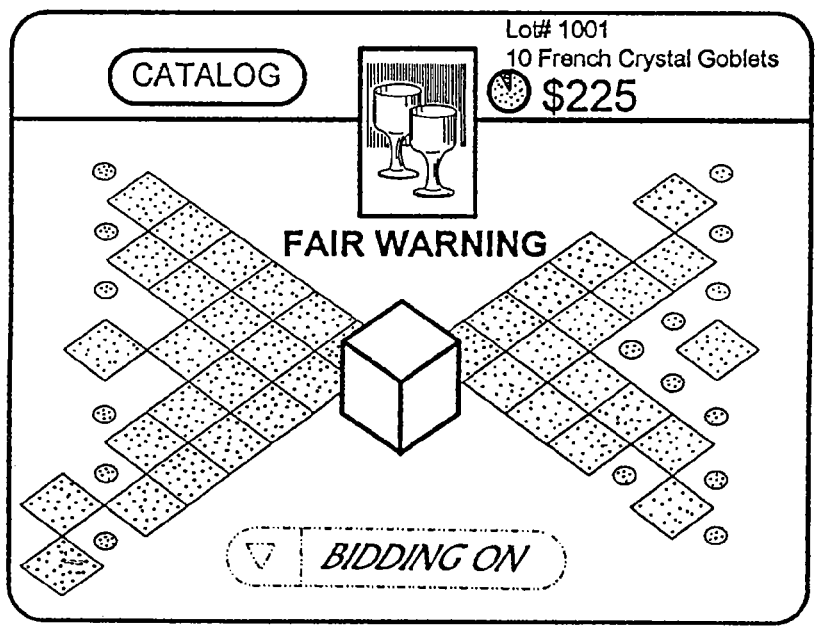
Figure 1M:
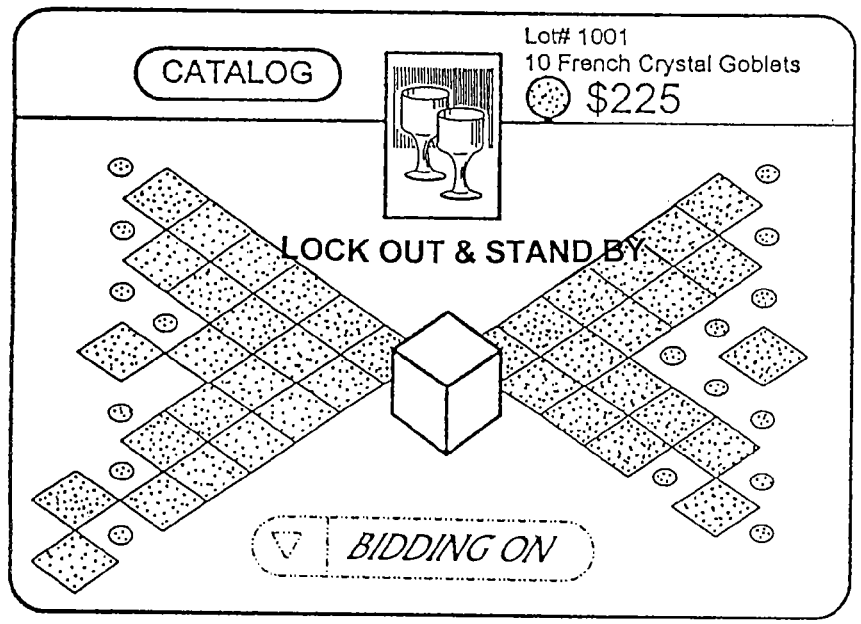
Figure 1N:
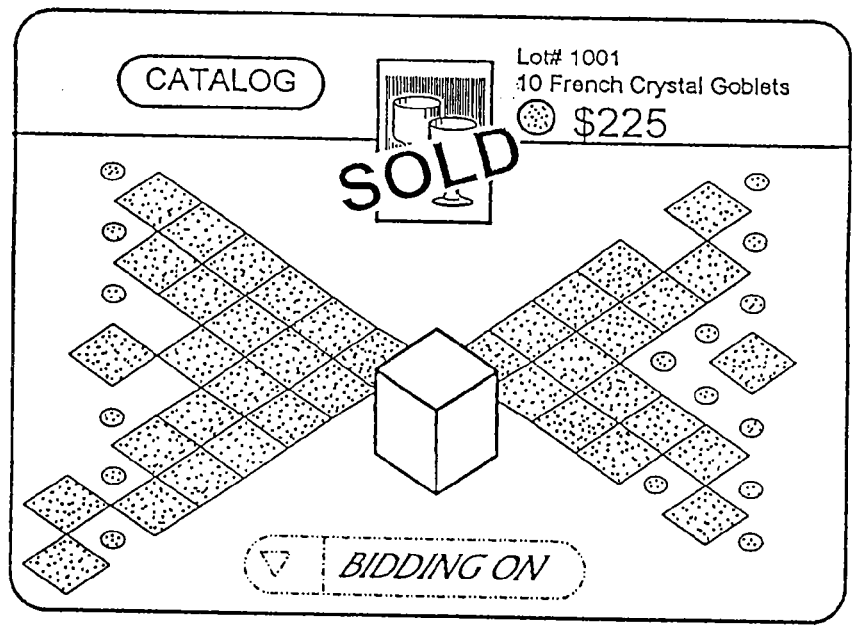

Turning now to the drawings, FIGS. 1A-N are screen shots of an auction of a preferred embodiment. FIG. 1A shows an item introduction in the auction. During this introduction, the following audio is played: "Our first auction is for Lot #1001." A set of 10 French Crystal Goblets." FIG. 1B shows the auction "floor." When this screen is presented, the following audio is played: "Allright, we'll start the bidding at $150 . . . " In FIG. 1C, the user unlocks bidding, thereby identifying that she is "ready to bid." FIG. 1D shows auction "floor" bidding, where bidder squares light up on screen as bids roll in. The following audio is played while this screen is displayed: "150-150-150 . . . going for $150 . . . .". The winning bidder's cube pops up in FIG. 1E, as all other bid attempts return to grey. The timer starts. The next round of bidding begins, as shown in FIG. 1F, with the following audio playing: " . . . 175 . . . 175 . . . 175." The participant rolls over icon and clicks, which immediately highlights her icon, like the other bid attempts. FIG. 1G show another bidder wins. Since the participant bid but did not win, the indicator shows the participant her bid speed relative to the winner's in milliseconds. The past winner sinks away. In FIG. 1H, the participant tries to out-bid again at the next ask price. FIG. 1I shows that the participant wins the bid, and past winners sink away. FIG. 1J asks for counter bids with the following audio playing: " . . . 225 . . . 225 . . . 225." There are no counter bids, and, as shown in FIG. 1K, with time running out, the following audio is played: "Anybody for $225 . . . $225 . . . $225 . . . " A last chance is given in FIG. 1L with the audio "Fair Warning . . . " being played. FIG. 1M shows closing of the sale, with the audio "Lock Out & Stand-By . . . " being played. FIG. 1N shows the item being sold, and a hammer sound effect is played along with the following audio: "Sold . . . " " . . . for $240."

Figure 2:
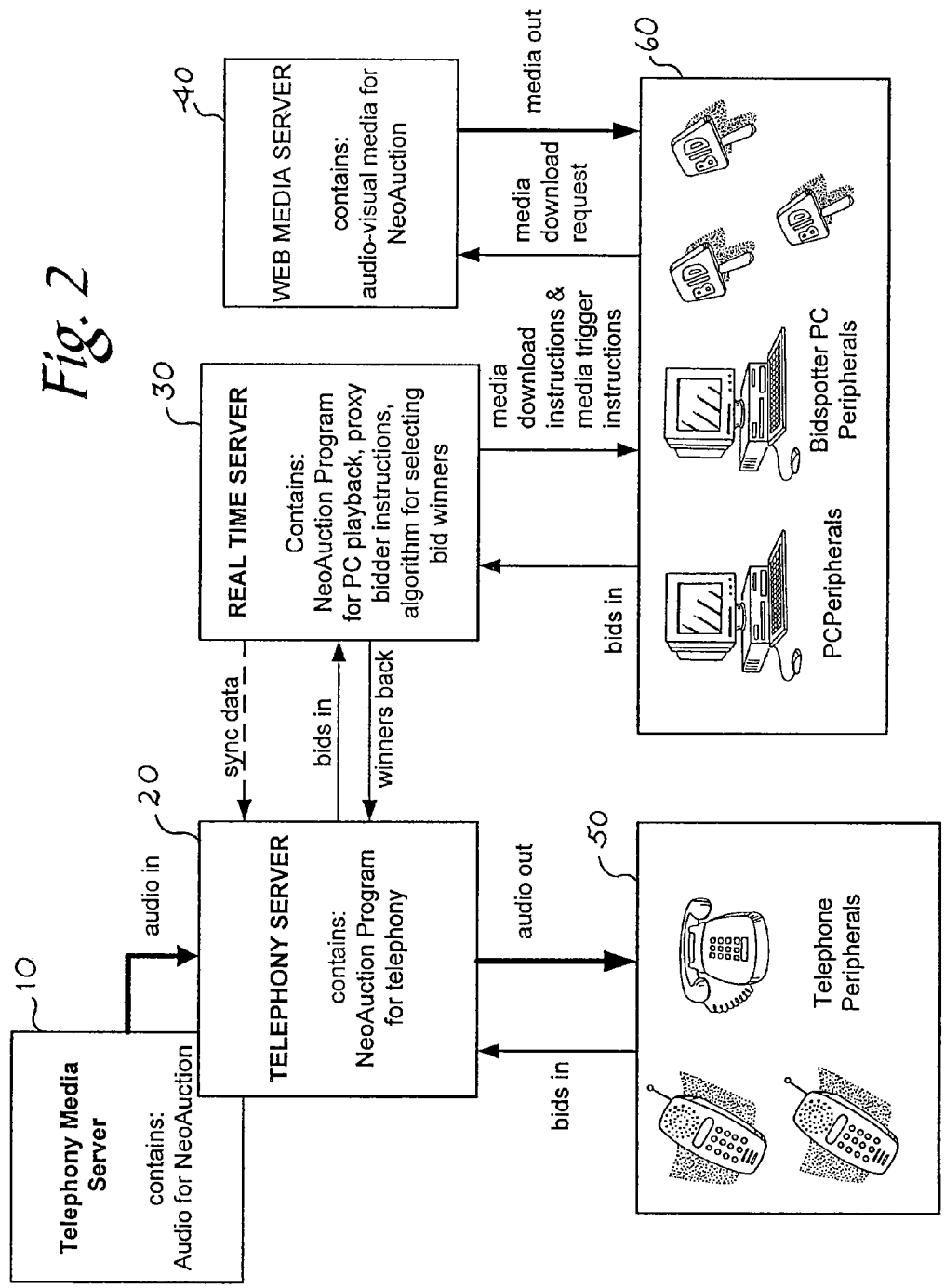
FIG. 2 is a block diagram of a system of a preferred embodiment.

FIG. 2 is a block diagram of a typical NeoAuction configuration. This system comprises a telephony media server 10, a telephony server 20, a real time server 30, a web media server 40, telephone peripherals 50, and a set 60 including PC peripherals and Bidspotting PC peripherals. The telephony media server 10 contains audio for the NeoAuction, and the telephony server 20 contains the NeoAuction program for telephony. The real time server 30 contains the NeoAuction program for PC playback, proxy bidder instructions, and an algorithm for selecting bid winners. The web media server 40 contains audio-visual media for the NeoAuction. The "bids in" in this diagram can include potentially, proxy bids. There are variations that can be used. If the number of simultaneous bidders is high (e.g., over 500), then the real time server 30 may need to be a series of subservers, each with connection to some of the simultaneous bidders. These subservers would be connected to a master real time server that receives all bids in, selects winners, and sends sync data to the subservers, which in turn sends data out to the peripheral. There could be additional subservers like the telephony server which feeds media to and collects data from other types of "dumb" peripherals (e.g., interactive TV). If the peripheral is not "dumb," then the subserver may have a method of interacting with the "smart" peripheral similar to the real time server/web media server, instead. It is also possible, if the number of bidders is more limited, for one server (one piece of hardware) to do the work of both the real time server 30 and the web media server 40.

Figure 3:
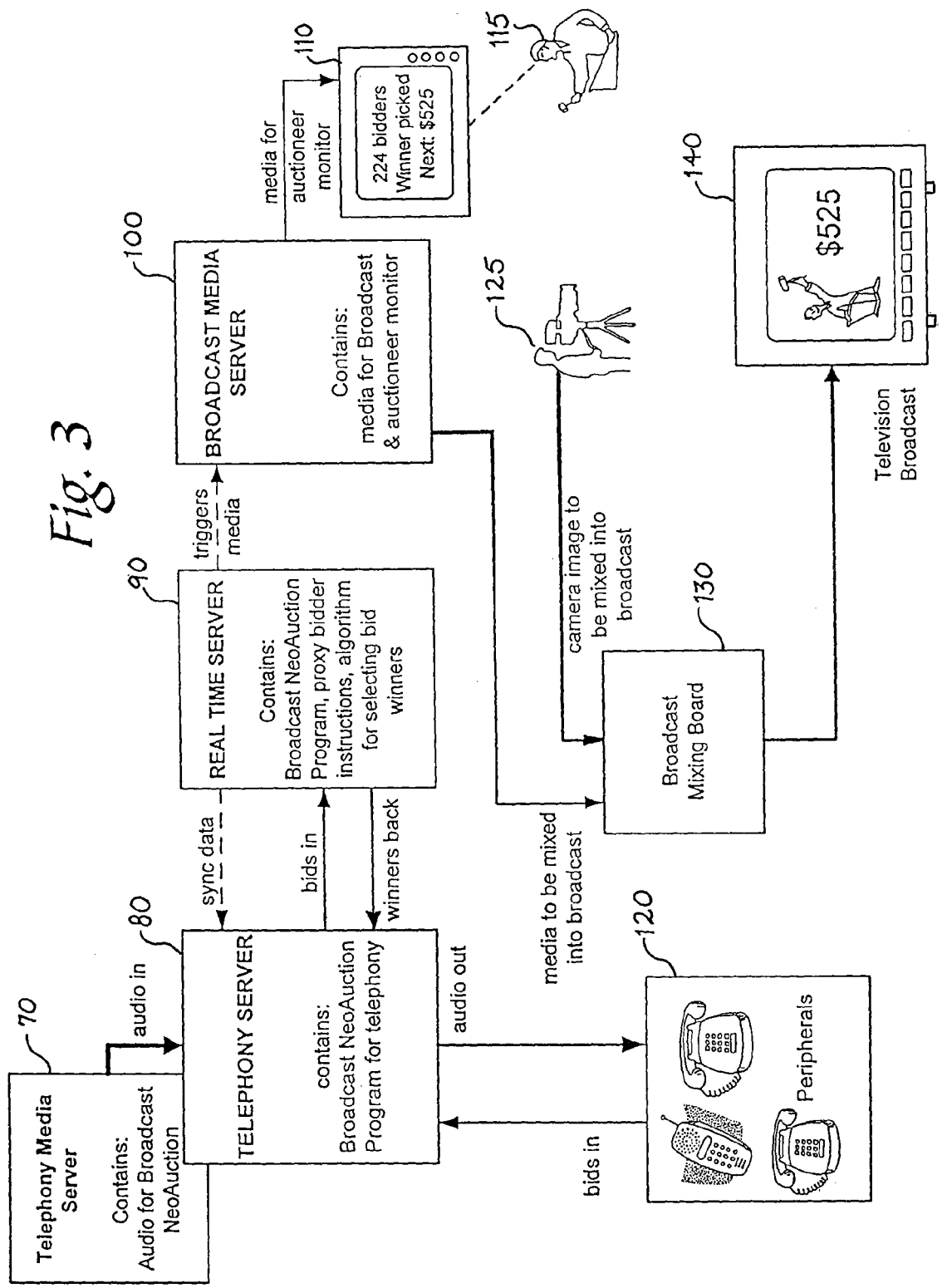
FIG. 3 is a block diagram of another system of a preferred embodiment.

FIG. 3 is a block diagram of a typical Broadcast NeoAuction configuration. This system comprises a telephony media server 70, a telephony server 80, a real time server 90, a broadcast media server 100, an auctioneer monitor 110, an auctioneer 115, a camera 125, a set of peripherals 120, a broadcast mixing board 130, and a monitor 140. The telephony media server 70 contains audio for the Broadcast NeoAuction, and the telephony server 80 contains Broadcast the NeoAuction program for telephony. The real time server 90 contains the Broadcast NeoAuction program, proxy bidder instructions, and an algorithm for selecting bid winners. The broadcast media server 100 contains media for broadcast and the auctioneer monitor 110.

There are variations that can be used. If the number of simultaneous bidders is high (e.g., over 500), then the real time server 90 may need to be a series of subservers, each with connection to some of the simultaneous bidders. These subservers would be connected to a master real time server that receives all bids in, selects winners, and sends sync data to the subservers, which in turn sends data out to the peripheral. There could be additional subservers like the telephony server which feeds media to and collects data from other types of peripherals (e.g., interactive TV or PC's). These peripheral servers would also require sync data from the real time server 90 to keep the user experience on the peripheral in sync with the broadcast program. This diagram shows a broadcast television program, but the broadcast could be over the radio as well, in which case the broadcast media server may not need to feed media into the broadcast mixing board 130, as the on-air talent might supply all the audio necessary. The broadcast mixing board 130 is likely run by a human who, as in most television programs, determines what media is on screen. But the broadcast media server cues up the ask price and potentially winner names and other info for the director to elect to put on screen. The real time server 90 could also directly drive the auctioneer monitor 110, which would also be available to crew in the broadcast control room, to allow them to see what is happening with the bidding and allow them to manually cue up and show all sound and images that will be broadcast. The diagram shows a visual monitor 110 for the auctioneer 115, but the monitor could be in the form of an earpiece or tactile device that gives the auctioneer 115 the information s/he needs (e.g., when a winner has been picked, what the next ask price should be, etc.).

Figure 4:
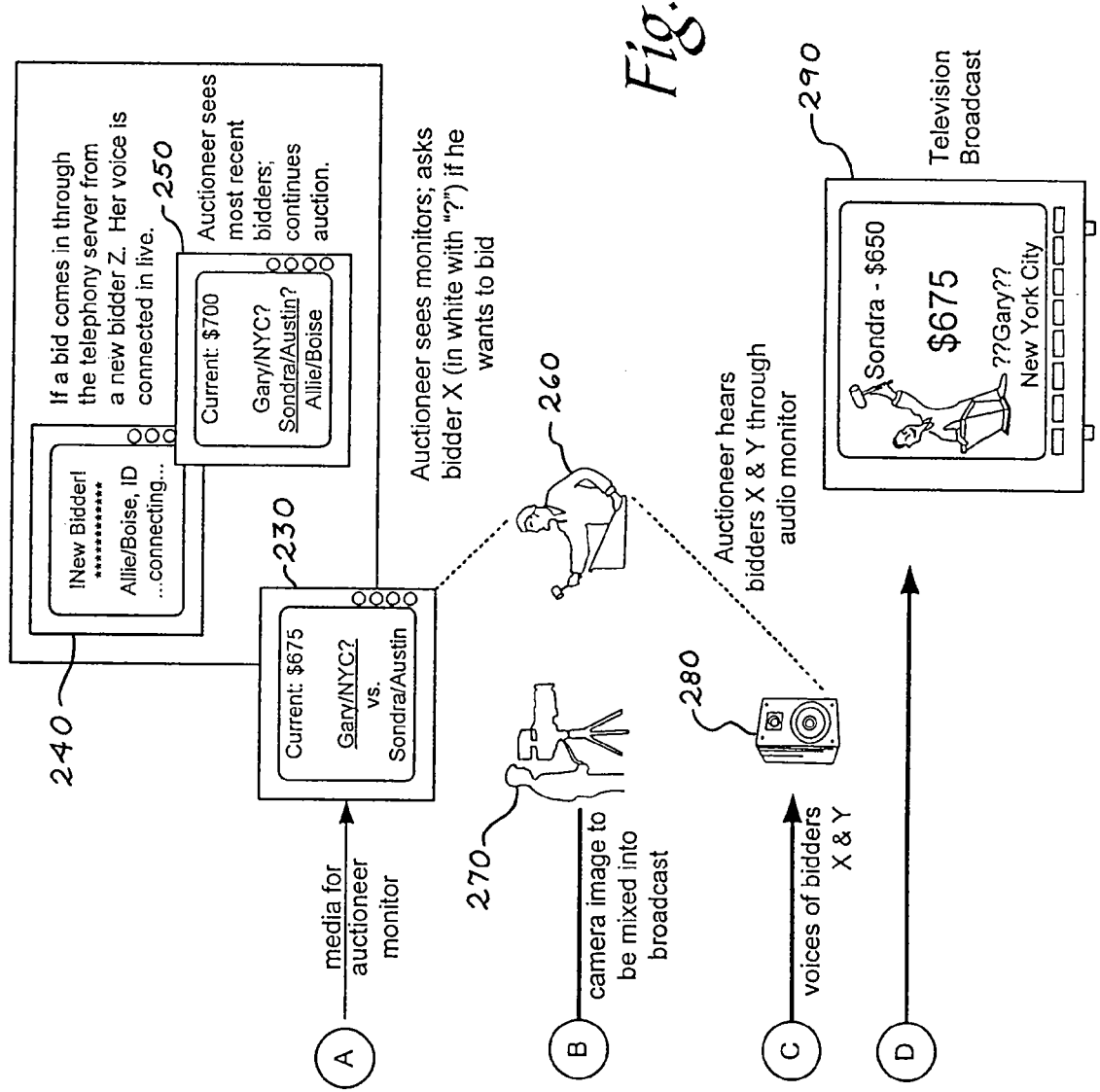
FIG. 4 is a block diagram of another system of a preferred embodiment.

FIG. 4 is a block diagram of a typical Broadcast NeoAuction configuration with end of auction—manual bidding. This system comprises a telephony media server 150, a telephony server 160, a real time server 170, a broadcast media server 180, an auctioneer monitor 230, 245, 250, an auctioneer 260, a camera 270, peripherals 190, telephonic peripherals 200 connected live into broadcast, a control room 210, a broadcast mixing board 220, a speaker 280, and a monitor 290. The diagram shows the peripherals 190 sending bids in to the telephony server 160. This is the case unless a call has been transferred to be connected live into broadcast, in which case the peripheral may no longer be connected to the telephony server 160 (although the telephone server 160 can still be "listening"). The variations discussed above in conjunction with FIG. 3 apply.

CONCLUSION

Any term, concept, feature, drawing, method, apparatus, system, etc. or portion thereof, described herein can be used alone or in combination with each other to support claims of any non-provisional patent application(s) claiming the benefit of this provisional application. Additionally, the material described herein provides only some of many possible implementations. For this reason, it is intended that the foregoing detailed description be understood as an illustration of selected forms that the invention can take and not as a definition of the invention. It is only the following claims, including all equivalents, that are intended to define the scope of this invention.

APPENDIX A

NeoAuctionOne

On a black background, the text, "The auction demonstration you are about to view is the property of Jellyvision, Inc. This auction demo contains confidential, proprietary, and trade secret information" appears in white. The text fades out.

On a black background, the word "Jellyvision®" appears in white, in the script/font associated with the Jellyvision logo. A male voice (hereafter referred to as "Host") says "Sold!" as a purple speech bubble appears at the upper left of the "Jellyvision" script with the word "SOLD!" in it in white text, accompanied by a sound effect. Beneath the Jellyvision script, the words "The Jellyvision Auctioneer" and "The First Demonstration" appear. The words and art fade out.

On a black background, the words "Bette Davis Poster" appear in white bold text at upper center. Beneath these words is "Deception, 1946 Film Noir" in white bold text. Beneath these words are five bullet points. They read:
  From the mid-30's to the early 50's she was the "First Lady of Movies"
  Original Insert
  Excellent Condition
  36"×14"
  The customary three horizontal folds To the right of these bullet points is a box with a picture of the item up for bid, in this case a poster of Bette Davis. At upper right of the screen, the text "Item # 714394044" appears in orange. Beneath the bullet points, the text, "Opening Bid: $85" and "Seller:BarneyFlicks" appear in bold yellow. Beneath these words, the phrase "Reserve Applied" appears in orange. At bottom of the screen appears the following text: "Bidding Begins In 0 minute 12 seconds" in white. This timer begins counting down. As " . . . 11 seconds" becomes " . . . 10 seconds" a female voice says "Ten seconds." The timer continues counting down by seconds. When the timer reaches 5 seconds, the female voice says "Five seconds, please stand by for our next auction." When the timer reaches zero, this screen disappears.

Host says "Bidders, you ready?" Background music begins.

The picture of the Bette Davis poster appears at upper center in a box. To its right at upper right of the screen appears the text, "Bette Davis Poster" and "Deception, 1946 Film Noir" in bold white. Beneath this text, "Item # 714394044" appears in orange. At bottom right of the picture box containing the Bette Davis poster photo, the letter "i" appears in a blue circle with the text "info" next to it. At bottom right, a green ball appears with the number 77 in it. Immediately beneath this ball is the text "FilmNoir." This ball represents the current user, whose nickname is "FilmNoir." The ball is animated and moves in place, in a circular pattern. Numerous gray balls, smaller than the green 77 ball representing the current user, appear in a grid at lower left, and are numbered from 20-49. These balls indicate some portion of all the other online bidders currently attending the auction. At upper left of this grid of gray balls is one orange ball with the letter "S" in it. This ball represents the seller of the current item up for bid. Host says "All right, we're starting this item at $85." The text "$85" appears at center in large, blue text, accompanied by a sound effect. It begins "filling" with red text from bottom to top to indicate that time is elapsing for a bid to be placed at $85. Host says "85, 85, who's got 85?"

A white "mouse pointer" arrow moves about the screen indicating action from the current user. As the pointer moves over the current user's green 77 ball, a paddle appears with the word "BID" in it in blue text. The pointer moves away. It moves over the 77 ball again, and the paddle with "BID" on it appears again. This is repeated again. After a few seconds, host says "Come on, who's gonna start us off here?"

Six bidders bid at roughly the same time, indicated by each of their gray balls shooting up to center screen with a sound effect (NOTE: Hereafter, when something on the screen moves in a new way or changes positions, or when a new piece of art appears on-screen, it is generally accompanied by a sound effect.) When this occurs, empty spaces remain at the lower left grid in the spots that the numbered balls occupied there. In this case, the numbered balls are 43, 20, 33, 42, 24, and 44. The 43 ball is at left because it represents the fastest bidder. The host says, "Whoa, thank you." Next to the #43 ball, a paddle with the word "BID" appears and wobbles back and forth as the text "FASTEST BIDDER!" appears in yellow above the ball. (NOTE: This animation hereafter referred to as "fastest bidder animation") Beneath the #43 ball now appears the bidder's nickname, "Matinee." Quickly the #43 ball moves to upper left of the screen and becomes a red ball instead of gray. The other five bidders' balls move back to the lower left grid.

At this time, a cream-colored price tag appears overlapping the left side of the picture of the item up for bid—the Bette David poster. The price tag says "$85."

The text "$90" appears in blue at center and begins filling with red text. Host says, "90 dollars!" Nine bidders, including the current user (#77, FilmNoir) immediately bid. The eight other numbered balls appear at center. In this case the current user is the fastest bidder, and the fastest bidder animation plays for the #77 green ball at lower right. Sound effects play and the #77 ball moves to upper left, where all current high bidders are displayed. "FilmNoir" remains beneath the #77 ball. The #43 ball (the previous high bidder) moves back to the grid of gray balls at lower left, but is set apart from the other gray balls in the grid by a flickering orange "halo" animation. This indicates that the bidder represented by this numbered ball has made the previous high bid. The price tag changes to $90.

The text "$100" appears at center in blue and begins filling with red. Host says, "100 dollars!" Three bidders bid, and their three balls appear at center. #24 ball is the fastest bidder, and next to it plays the fastest bidder animation. The #24 nickname, "MovieStar" appears beneath the ball. The #24 ball shoots to upper left with "MovieStar" beneath it. The #77 ball returns to its position at lower right. Host says "Fabulous." The price tag changes to $100.

The text "$120" appears at center in blue and begins filling with red. Host says "How 'bout one-twenty?" The white mouse pointer moves around, but no bid is placed. Host says "Looking for one hundred and twenty dollars." The "$120" has is almost completely red when the host says, "Come on . . . somebody . . . a hundred and twenty bucks."

The text "$110" appears at center in blue and begins filling with red. Host says, "Ah, backin' it up. One hundred and ten." The number continues to fill in with red. Host says, "What do you say, 77?" The #77 ball elevates to center left from lower left and three gray question marks rotate around it. Host says "It's only 20 bucks more than your last bid." No activity occurs as the "$110" continues to fill with red. The white mouse pointer moves over the #77 ball and moves away. This happens four times. Host says, "Don't hold back, you know you want it!" before the current user finally places a bid. The fastest bidder animation plays for the #77 ball at lower right. The #77 ball moves up to upper left with "FilmNoir" beneath it. Host says, "Ah, there you go." The price tag changes to $110 as the #24 ball moves back to the grid and retains a flickering red "halo."

The text "$120" appears at center in blue and begins filling with red. Host says "Okay, once again, one-twenty!" The #24 ball makes a bid and appears at left center. The fastest bidder animation plays and the #24 ball shoots to upper left with "MovieStar" beneath it and becomes red. The #77 ball returns to lower right with "FilmNoir" beneath it. Host says "Excellent!" as an orange dog-ear triangle appears at upper left with the white text "RESERVE MET." Host says, "And we just blew past the reserve!" The price tag changes to $120.

The text "$130" appears at center in blue and begins filling with red. Host says, "Goin' up to one-thirty." The current user places a bid. The fastest bidder animation plays for the #77 ball at lower right. The #77 ball moves up to upper left with "FilmNoir" beneath it. The price tag changes to $130 as the #24 ball moves back to the grid and retains a flickering red "halo." Host says, "Slap shot!"

The text "$140" appears at center in blue and begins filling with red. Host says, "One hundred and-forty!" The #24 ball makes a bid and appears at left center. The fastest bidder animation plays and the #24 ball shoots to upper left with "MovieStar" beneath it and becomes red. The #77 ball returns to lower right with "FilmNoir" beneath it. Host says "Service returned!" The price tag changes to $140.

The text "$150" appears at center in blue and begins filling with red. "Let's do it, a hundred and fifty bucks." No activity occurs as the "$150" continues to fill in with red. Host says, "77, it's in your court." The #77 ball elevates to center left from lower left and three gray question marks rotate around it. After a few seconds, two other gray balls appear at center with the three rotating gray question marks around them, #43 ("Matinee") and #36 ("ScriptGirl"). Host says, "How about you two?"

A doorbell sound effect plays. The host says, "Oh, hang on a second, the seller's got something to say here." The center text "$150" fills entirely with red. At left, the orange S ball appears with "BarneyFlicks" beneath it. There is a speech bubble associated with the S ball. Inside the speech bubble is the text "Bonus VHS of movie if at least $175." A male voice (the recorded voice of the seller with the nickname "BarneyFlicks") says, "I just wanna say "Deception" is one of the most god-awful movies Bette Davis ever made, but you are going to love it, it's so funny. And a reminder, if the bidding . . . if the winning bidder is at least $175, I will throw in a bonus VHS copy of the movie with the poster." Host says, "Thank you, seller. All right, so what do you say?" The #31 ball makes a bid and appears at left center. The fastest bidder animation plays and the #31 ball shoots to upper left with "SunsetBlvd" beneath it and becomes red. Host says, "Oh-ho! New blood!" The #77 ball returns to lower right with "FilmNoir" beneath it. Host says "Service returned!" The price tag changes to $150.

The text "$175" appears at center in blue and begins filling with red. Host says, "Here we go, for the special bonus, one hundred and seventy five dollars." The current user places a bid, and is the first of fiver bidders at this price. The fastest bidder animation plays for the #77 ball at lower right. The #77 ball moves up to upper left with "FilmNoir" beneath it. The price tag changes to $175 as the #31 ball moves back to the grid and retains a flickering red "halo." #24 maintains an orange halo. Host says, "Yeah, baby!"

The text "$190" appears at center in blue and begins filling with red. Host says, "One-ninety!" The text "$190" continues filling with red. Host says, "Lookin' for one hundred and ninety bucks." The text "$190" continues filling with red with no bidding activity. Host says, "So we've got a bunch of people jumping in at the special bonus amount and then everybody wusses out, is that right? Fine." The center text "$190" fills entirely with red and a buzzer sound plays. The large text "GONG ONCE" appears over the "$190" in yellow. Host says, "Goin' once!" The #24 ball makes a bid and appears at left center. The fastest bidder animation plays and the #24 ball shoots to upper left with "MovieStar" beneath it and becomes red. Host says, "Bidder 24, you da bomb!" The #77 ball returns to lower right with "FilmNoir" beneath it. The price tag changes to $190.

The text "$200" appears at center in blue and begins filling with red. Host says, "My friends, we are still alive! Two hundred dollars." Now only the #31 ball has a flickering halo—it is red. Host says "Come on, two Ben Franklins, who's got 'em?" The text "$200" fills entirely with red and a buzzer sound plays. The large text "GOING ONCE" appears over the "$200" in yellow. Host says, "All right, going once!" Even larger text "GOING TWICE" appears over the now larger text of "$200" in yellow. Host says "Going twice!" Whistle sound plays and the text "LOCKOUT AND STANDBY" appears in red over the $200. Host says "Lock out and stand by." The yellow text "SOLD!" appears at an angle on screen at center. Host says "Sold! Bidder 24, congratulations." The #24 ball with "MovieStar" beneath it appears to left of the "SOLD!" text and the "SOLD!" text moves to the right.

Host says, "Seller?" A character voice says, "Yeah?" as the "S" ball appears on-screen. The "SOLD!" text disappears and the "S" ball with "BarneyFlicks" beneath it appears next to the "24" ball with "MovieStar" beneath it. "Host says, "Congratulations to you, too." A character voice says, "Wee-hoo!" as the "S" ball gyrates. The host continues, "Since you're both here online, I'm going to throw you two into a post-auction chat room so you can confirm on payment and shipping and those sort of details, okay?" Character voices yell "Yay!" and the balls sweep off-screen to the right. Host says "All right, let's go on to the next item. Sandy?"

SCREEN GOES BLACK.

APPENDIX B

NeoAuctionTwo-LayOutBidders

This demo shows the capabilities of an online auction to host over 2000 users and have each of those users represented on-screen by a graphic image—in this case, a small wooden paddle. It also shows the capability to recognize when bids are made and who has won a particular bid by being the fastest bidder, no matter how small the images associated with each user must become (in this case, small wooden paddles) in order to fit them all on-screen.

The opening screen is an all-white background. At the bottom of the screen are four "buttons" that may be pressed using the mouse on the operator's computer.

The first button is rectangular and has a black background with dark gray text that reads "ADD PADDLE." It appears at far left.

The second button, to the right of the first button, is a gray oval with a black outline and light gray text that reads "WIN BID."

The third button, to the right of the second button, is a gray oval with a black outline and light gray text that reads "BID."

The fourth button, to the right of the third button, is a gray oval with a black outline and light gray text that reads "BID." This button appears at bottom center.

To the right of these buttons and slightly raised is a counter. On the opening screen, this is the number "0." This text for this counter is dark gray.

Any time the operator moves the white mouse pointer over a button, the button brightens or "highlights."

"ADD PADDLE" BUTTON—When this button is clicked once by the operator, a paddle is added to the screen, and the "counter", defined above and initially set to zero, increases by one in number to always reflect the number of paddles on screen. As paddles are added, they form a triangle formation starting with paddle #1 in the center of the screen and expanding to the left. After paddle #15 is added to the fourth row, any new row formed requires additional space. Therefore, when paddle #16 is added, all paddles shrink slightly in size so that the first paddle (paddle #1) remains at the same location at the center of the screen. Any time the "ADD PADDLE" button is pressed and the new paddle to be added requires a new row to be formed, all paddles shrink slightly to again accommodate the new row. In this way, very large numbers of paddles can be added, while the first paddle remains at center and the entire triangular formation of paddles as a whole does not increase greatly in size.

"WIN BID" BUTTON—When this button is clicked, one paddle (a representation of a user or "bidder") turns purple and begins spinning. This represents how a winning bidder would be portrayed if they were the fastest bidder at any particular price point. In addition, a purple rectangle with a black triangular pointer at its bottom appears above the spinning paddle. Inside the purple rectangle is white text which identifies the user/winning bidder by their nickname and a series of numbers that represents their identity within that particular auction. For instance, the white text "JolliGreenG" might appear with the smaller text "RP5 TP3" beneath it. Repeated clicks of this button will show how the winning bidder might change from user to user throughout an auction, and how that would be visually represented.

"BID" BUTTON—When this button is clicked, a single paddle in the formation of paddles will animate by being "raised up." This is a representation of how, during an auction, any bidder who makes a bid would be identified at any time. Multiple bids may take place at a particular price point before the winning bidder (i.e. the fastest bidder at that price point) is officially recognized by the animations described above in the "WIN BID" BUTTON section. Therefore, multiple paddles may raise at particular price point. Clicking this button shows how any bidder would be recognized before the winning bidder is shown.

"RESET" BUTTON—This button clears the screen to its original state.

APPENDIX C

NeoAuctionOne-Item Description

On a black background and inside a white rectangular border, an orange ball with a white "S" on it and the white text "BarneyFlicks" beneath it appears to the left of a light blue ball with a white "31" on it and the white text "SunsetBlvd" beneath it. Both are at center. A picture of a Bette Davis poster that is "up for bid" appears at upper center in a box. To its right at upper right of the screen appears the text, "Bette Davis Poster" and "Deception, 1946 Film Noir" in bold white. Beneath this text, "Item # 714394044" appears in orange. At bottom right of the picture box containing the Bette Davis poster photo, the white letter "i" appears in a blue circle with the white text "info" next to it. At bottom right, a white mouse pointer appears.

The host says, "Since you're both here online, I'm going to throw you two into a post-auction chat room so you can confirm on payment and shipping and those sort of details, okay?" Character voices say "Yay!" as the balls exit quickly to the right of the screen. The host says, "All right, let's go on to the next item in tonight's Classic Movie Channel auction. Sandy?" As he says this, the screen changes to a black background with a white rectangular border with a logo at top in light blue that reads "Classic Movie" over the word CHANNEL." The "o" in "Movie" is indicated by an image of a gray film reel. A horizontal light blue line separates the words "Classic Movie" and "CHANNEL." Next to this logo at top right is a red price tag image with the white text "Auctions" in it. Inside each of the four corners of the rectangle border, a spinning film reel is animated.

The hostess says, "Okay, item number 714398721." At this time, the gray text "Item # 714398721" appears at center.

Player piano-style music begins. The hostess continues, "In 1969, a film called 'Butch Cassidy and the Sundance Kid' revived the career of actor Paul Newman and made Robert Redford a star." As she says this, at right, a gray-bordered image of a "Butch Cassidy and the Sundance Kid" color movie poster appears and slowly scrolls from top to bottom.

The image in the gray border at right changes to become the item up for auction: a black-and-white autographed Paul Newman publicity poster. The hostess says, "This item is an original Paul Newman publicity still with his authentic signature. Paul Newman as Butch Cassidy. One of the most memorable characters in his distinguished career." Also at this time, the crème-colored text "Paul Newman Publicity Still With Authentic Signature" appears at left in bold.

A gray-text bullet point appears beneath this text. The text reads, "Authentic Paul Newman autographs are very scarce." As this appears, the hostess says, "Authentic Paul Newman autographs are very scarce. Many out on the market were actually signed by his secretary. This one was not." As this is said, the image at right becomes a close-up of the signed section of the Paul Newman poster. The image then begins scrolling back up to the top of the poster slowly throughout the reading and appearance of the next four bullet points.

A second gray-text bullet point appears below the first bullet point. This text reads, "Signed by Paul Newman himself in New York." As this appears, the hostess says, "It was signed by Paul Newman himself in New York."

A third gray-text bullet point appears below the second bullet point. This text reads, "Signed with a black marker" As this appears, the hostess says, "He signed the photo with a black marker."

A fourth gray-text bullet point appears below the third bullet point. This text reads, "Black & White" As this appears, the hostess says, "The photograph is black and white."

A fifth gray-text bullet point appears below the fourth bullet point. This text reads, "Excellent Condition" As this appears, the hostess says, "It is in excellent condition. It would make a tremendous gift for yourself or someone you know who is a fan of this living legend."

Crème colored text then appears at lower left below each these bullet points that reads: "Opening Bid: $50." As this appears, the hostess says, "The opening bid will be fifty dollars." Also at this time, the close-up of the image of the poster fades back to the original view of the entire poster. And as with all Classic Movie Channel auctions, there is no reserve." As the hostess says this, smaller creme-colored text reading "No reserve" appears below the "Opening Bid: $50" text.

"For more details including our payment and shipping terms, or to see other items in our catalogue, just click on the info button." The item number appears again in gray beneath the image of the poster as the hostess says this. A sound effect plays at the end of her sentence as an icon with a blue circle and a white "i" in it next to the white text "info" appears over the lower left of the image of the poster of Paul Newman.

The host says, "Great. Thank you Sandy." The hostess says "You bet." The host says, "Bidding on this item will begin in a little over a minute, so stick around." As he says this, a gray oval appears at bottom of the screen, covering both spinning gray film reels in the lower left and right corners. Inside this oval is the white text, "1 minute 15 seconds." This timer counts down to "1 minute 12 seconds" before the screen fades to black.

APPENDIX D

NeoAuctionTwo

On an orange background, the word "DEMO" appears at lower right in dark orange. Next to this is an icon of a circle with a triangle in it, indicating an arrow to be clicked to begin the demo. At upper center, the Jellyvision logo appears—a purple speech bubble outlined in white with the white text "Jellyvision®" inside it. Beneath the Jellyvision logo at center is an image of an electronic megaphone. Below the image of the megaphone at lower center is the text "voxtioneer" in dark orange.

A click of the circle/triangle icon brings up the next screen. Light orchestral music begins playing in the background. On a white background, a blue-outlined box appears in the center of the screen. Inside the box is the blue text, "Semi-annual Auction of Antique European Housewares" in bold. Beneath this text in the box is the text, in a lighter blue color, "Apr. 7, 2005" and "3:00 pm CST." Above this box is another box, this one rectangular with a darker blue background and the white overlapping letters "d" and "H"—this box represents the logo for Dvarjek House. Behind the upper half of this logo and stretching across the screen is a light blue rectangle with multiple medium-blue instances of the phrase, "dvarjek House" appearing in it. At bottom center in bold blue text is the phrase "AUCTION BEGINS IN 16 SECONDS." This is a timer that counts down from 17 to 0 seconds.

When the timer reaches 2 seconds, new music begins playing and the screen begins to change from a white background to a blue background. Now on a blue background, the "d" and "H" box representing the Dvarjek House logo remains, moves to upper left, and stretches out across upper center. The "d" and "H" separate onto two lines, and the entire words "dvarjek" and "House" appear on top of each other in a new logo, now at top center. As the host (a male voice) begins to speak, a series of 20 images begins appearing and disappearing from the screen. Nineteen of these are images are photos of antique European housewares that will be up for bid at auction. These images appear in varying sizes of square and rectangular boxes at various points on the screen, appearing and disappearing in about 2 seconds each. One image is a photo of the fictional host with the text "Lawrence Calicott" beneath it. While these images appear, the Dvarjek House logo remains at center top. When the picture of the fictional host disappears from center, a white-outlined box appears in its place with the text "Semi-annual Auction of Antique European Housewares." This text appears with an image of Europe in the background of the box in multiple shades of blue. The nineteen auction images continue to appear around this box and the Dvarjek House logo as the host continues to speak. During this time, the host dialogue is as follows:

"Good afternoon, everyone. My name is Lawrence Calicott. In behalf of the Dvarjek House, it is my pleasure to welcome you to our Semi-annual Auction of Antique European Housewares. We have today 328 wonderful objects for sale. While most hail from Spain, France, Italy, and the Netherlands, we also have a number of fascinating pieces from Russia, Prussia, and Austria."

As the final of the 19 images disappears, the host says "You can access today's catalogue at any time by pressing the catalogue button." As this dialogue occurs, the box containing the text, "Semi-annual Auction of Antique European Housewares" wipes away to reveal an image of the Dvarjek House catalogue at center. Beneath the image of the catalogue is an oblong "button" in light blue, with the text "CATALOGUE" on it in white. The button is then highlighted as a doorbell sound effect plays, representing what would happen if the user pressed the "CATALOGUE" button. At this point, a business-card-sized image appears over the image of the catalogue at center. This image is a white rectangular "card" with information about a specific object up for auction. In this case, the text reads "Sale 10749 Lot 17" in bold black at upper left. Beneath this on the card is the black text "A Viennese Opaque enameled ranftbecher, circa 1820, attributed to Anton Kothgasser." Beneath this on the card is the bold black text "Estimate: $400-$600." At lower left of the card is a small light blue box with the gray text "Proxy Bid" on it. The small box indicates a location on-screen where the user may click to select the Proxy Bid option. Beneath this small box and text is a rectangular box, outlined in light blue. This box indicates a location on-screen where a user may enter a Proxy Bid. Beneath this rectangular box are several black triangles and horizontal lines which create icons indicating ways to move forward or backward in the catalogue, if clicked by the user. At the right of the card is a large image of the object being described, in this case, an antique vase. Next to the image at lower center is a small gray magnifying glass icon, indicating a location on-screen where a user may click to see a larger image of the item. At the top of the card is a decorative light blue rectangle stretching almost across the entirety of the top of the card. At far upper right, there is a shadowed square with an "x" in it, indicating a place on-screen where the user may click to close or exit the catalogue. While this business-card-sized image appears, the host says, "Besides providing a detailed description of each item, it also contains all of our rules regarding bidding. If you are unable to stay with us today, you may place a proxy bid on any item directly from our catalogue at any point up until the start of the bidding on that item." As he says this last sentence, a red check-mark image appears in the small light blue box, and the text "$575" appears in the rectangular box. All of these images then disappear from screen as only the "dvarjek House" logo remains at top center on a blue background.

The host says "Our auctioneer at Dvarjek House is Mr. Arthur Trenton" as a picture of the auctioneer appears in a box at center with the text "Arthur Trenton" beneath it in white. As this image remains on-screen, a male voice representing the auctioneer says, "Aye, hello ladies and gentlemen." The host then says, "Shall we get started, Arthur?" The auctioneer then says, "That's what we're here for, let's get started!" The host then says, "Very good, let's begin," as the screen fades to all white.

Music volume increases as several small, identical images of brown wooden paddles appear in two sets of rows on-screen. The paddles appear in rows spaced in two mirrored triangles moving on to the screen, with the top of each triangle meeting in the center of the screen, and the triangles of paddles fanning to the outer left and right edges of the screen. The paddles approximate the appearance of actual seat positions at a live auction. As such, some "positions" remain empty, indicated by a small gray dot rather than a paddle. Each paddle indicates a person attending the auction online. The paddles on-screen get smaller as the rows fill in, to accommodate more paddles. The music volume decreases. The auctioneer says "Well, we have over 45 bidders here this evening. Let me give each of you a paddle." A few more paddles appear over previously unfilled positions (gray dots), and at bottom center, a large paddle with the dark brown text "89" appears. This paddle represents the current user. The host says "There you go."

The black text "To Bid CLICK TWICE on paddle" appears at center of the screen near the paddles. The host says, "Anytime you want to bid, you just click twice on your paddle." This text disappears as the host says, "Now then, Lawrence, if you'd please introduce the first item." The host says "Very good, let's begin." The music volume increases as the "dvarjek House" logo appears on screen. This logo moves to upper left and a long blue rectangle appears across the top of the screen. Next to the "dvarjek House" logo is the text "dvarjek House" in white. At far right of the blue rectangle at top is the small white text, "Lot #1001" and "10 French Crystal Goblets." The music ends.

The host says, "Our first auction is for lot one thousand and one, a set of ten French crystal goblets." A light blue oval appears at bottom of the screen in a light blue decorative band that stretches across the entire bottom of the screen. Next to this oval is a small image of a clock. A white mouse pointer, indicating the activity of the current user, moves over the "89" paddle and the paddle becomes brighter and bigger. This happens anytime the pointer moves over the current user's paddle.

As a sound effect plays, an image appears at the top center of the screen in a box—it is a picture of the current item up for bid, in this case, the photo is of two crystal goblets. This image overlaps part of the blue rectangle at the top of the screen. Just above the photo image is the oblong light blue "CATALOGUE" button seen before. As these appear, several more small paddles representing other participants in the auction (participants other than the current user) appear, indicating new attendees at the auction.

The host says, "These are the last of a special order manufactured by Bulchere in Grenoble, and when you tap on them with a salad fork (NOTE: a "ding-ding" sound effect plays here), even your crusty old uncle couldn't possibly make a poor toast after such a good ring. Arthur?" The auctioneer says, "Thank you, Lawrence. All right, we'll start the bidding off at a hundred and fifty dollars." At this time, the white text "$150" appears in the blue rectangle at upper right along with a sound effect. This white dollar amount begins "filling" with red from bottom to top as a sort of timer. The auctioneer continues, "A hundred and fifty, a hundred and fifty, who's got a hundred and fifty dollars? A hundred and fifty, a hundred . . . ." During the last few words of the auctioneer's dialogue, several paddle raise up on-screen with associated "popping" sound effects. Then a "ring-ring" sound effect plays, indicating a bid has been made. A purple rounded rectangle with black triangular "pointer" at its bottom appears over one of the paddles. This paddle turns light purple and begins spinning on its handle. Inside the purple rectangle is the white text "JolliGreenG" and the number "36." This rectangle floats directly above the light purple spinning paddle, indicating that the user controlling this paddle, with a nickname of JolliGreenG and an auction number of 36, was the first to make a $150 bid. The number at top right changes to "$175" with a sound effect and begins to fill with red.

The host says, "We're off to a good start! One-seventy-five, a hundred and seventy five dollars, a hundred and seventy five dollars, one-seventy-five, one-seventy-five . . . ." Again, several paddles raise up on-screen with associated "popping" sound effects, indicating numerous bids by several attendees. Also during this time, the current user makes a bid. This is indicated on-screen by the white mouse pointer moving over the "89" paddle at bottom center and the paddle and "89" text brightening and becoming larger, then gyrating with a sound effect. The "ring-ring" sound effect plays and the purple rectangle with pointer appears over a paddle representing another user. The white text in the paddle reads "JPConners" and "69" as that paddle turns purple and spins. AT this time, in the oval at bottom next to the clock, two bars appear next to each other. One bar at left and inside the oval is green with the white text "WIN" and the other bar is red to its right inside the oval, with the white text "YOU." The number at top right changes to "$200" with a sound effect and begins to fill with red.

The auctioneer says "Now two hundred! Two hundred dollars, two hundred dollars, two hundred, two hundred, two hundred dollars, who's got two-hundred . . . ." Again during this time, several paddles raise up on-screen with associated "popping" sound effects, indicating numerous bids by several attendees. Also during this time, the current user makes another bid. This is again indicated on-screen by the white mouse pointer moving over the "89" paddle at bottom center and the paddle and "89" text brightening and becoming larger, then gyrating with a sound effect. The "ring-ring" sound effect plays and the purple rectangle with pointer appears over a paddle representing another user. The white text in the paddle reads "JohnGavin" and "38" as that paddle turns purple and spins. At this time, in the oval at bottom next to the clock, the two bars again appear next to each other. One bar at left and inside the oval is green with the white text "WIN" and the other bar is red to its right inside the oval, with the white text "YOU." This time the red bar is even shorter than before. The number at top right changes to "$225" with a sound effect and begins to fill with red.

The auctioneer says, "Two and a quarter! Lookin' for two hundred twenty five dollars, two twenty five, two twenty five, who's got two hundred twenty five . . . ." During this time, the current user makes another bid. This is again indicated on-screen by the white mouse pointer moving over the "89" paddle at bottom center and the paddle and "89" text brightening and becoming larger, then gyrating with a sound effect. Another paddle raises in an attempt to make a bids, but the "ring-ring" sound effect plays and this time a green rectangle with pointer appears next to the "89" paddle, indicating the current user has made the fastest bid at this price. The white text in the paddle reads "ElenoraB" as the current user's paddle turns purple and spins. At this time, in the oval at bottom next to the clock, only the green "WIN" bar appears. The number at top right changes to "$240" with a sound effect and begins to fill with red.

The auctioneer says "Two hundred and forty! Two hundred forty dollars, two hundred and forty, two hundred and forty, lookin' for two hundred and . . . " Again during this time, several paddles raise up on-screen with associated "popping" sound effects, indicating numerous bids by several attendees. The "ring-ring" sound effect plays and the purple rectangle with pointer appears over a paddle representing another user. The white text in the paddle reads "Mishna241" and "14" as that paddle turns purple and spins. At this time the oval at bottom next to the clock contains no bars. The number at top right changes to "$250" with a sound effect and begins to fill with red.

The auctioneer says, "Now two and a half! Lookin' for two hundred and fifty dollars, two-fifty, two-fifty, who's got two fifty? Lookin' for two hundred fifty dollars, two hundred and fifty!" No activity occurs on screen as the previous winner's purple paddle continues to spin and the purple rectangle remains above it with "Mishna241" and "14" in it. The "$250" text at top has now become completely red. The auctioneer says "Come now, two fifty! Anyone for two hundred fifty dollars, two hundred and fifty dollars?" At this time, a large green rectangle with black triangular pointer appears next to the "89" paddle at lower center. At the top of this rectangle in white text is "EleanoraB." The lower half of the rectangle contains a black square of white text. This text reads, "Only $25 more than your last bid." The red "$250" text at top right is now pulsating. The previous high bidder's purple paddle continues spinning, but there is no longer a purple rectangle above it—this has become the green rectangle near the current user's "89" paddle. The auctioneer says, "Bidder eighty-nine, that's only twenty-five dollars more than your last bid. Not gonna lose out for that, are ya?" The white mouse moves over the "89" paddle at this time and a sound effect plays. The paddle gyrates, turns purple, and begins spinning, indicating the current user has made a bid at $250. The green rectangle with pointer reduces to now read only "ElenoraB." A longer "ring-ring-ring-ring-ring!" sound effect plays and the auctioneer says, "Lovely." The number at top right changes to "$260" with a sound effect and begins to fill with red.

The auctioneer then says "Two sixty! Two hundred sixty dollars, two hundred sixty dollars, two-six-oh, that's . . . " then the "ring-ring" sound effect plays and the purple rectangle with pointer appears over a paddle representing another user. The white text in the paddle reads "MOLLY_X" and "212" as that paddle turns purple and spins. The auctioneer says, "Thank you very much." The number at top right changes to "$270" with a sound effect and begins to fill with red.

The auctioneer says "89, we're back to you," as the green rectangle with pointer and the text "ElenoraB" moves back next to the "89" paddle at lower center. The previous high bidder's purple paddle remains spinning. The auctioneer continues, "Two-seventy. Two hundred and seventy dollars, two hundred and seventy dollars, we're looking for two hundred and seventy dollars, who's got two-seventy? Two seven-oh, two-seven-oh, two seventy?" The "$270" text at top right is now pulsating. The auctioneer says "Lookin' for two hundred and seventy dollars, who's got two-seventy? Two seventy . . . " The rectangle become purple again and moves back to the previous high bidder's purple spinning paddle. The purple rectangle contains the white text "MOLLY_X' and "212" once again. At this time, with a sound effect, a flashing yellow oval with white text "FAIR WARNING" appears at top right below the blue rectangle. The auctioneer says, "Fair warning!" A ticking clock sound effect plays. Then the flashing yellow oval shifts to center over the image of the two goblets and turns flashing red with a sound effect. The white text changes to read, "Lock Out & Stand By." The auctioneer says, "Lock out and stand by!" A three-ding sound effect plays.

The word "SOLD" appears in black at a diagonal across the image of the two goblets at center. The auctioneer says "Sold! For two hundred ad sixty dollars," as the price at upper right becomes a pulsating green "$260." The purple rectangle expands to larger size above the spinning purple paddle of the auction winner. At top of the purple rectangle, the white text reads "MOLLY_X" and a black square of text appears below it with the white text "212" and "Chicago, USA." The auctioneer says, "Bidder 212, congratulations to you. Cheers!" A "ding" sound effect plays.

The screen clears to white and then the paddles reappears in their previous spaces on the screen. The host says "Next up is lot number one thousand and two: eighteenth-century silverware." An image with a photo of silverware appears in a box at top center. The host continues, "This set was used in the home of Monsignor Cornitreaux in Paris. There are fourteen complete settings in the box, and . . . ." The screen fades to black as the music and host fade out.

The screen returns to its original orange-background setting as described above.

APPENDIX E

Sample Script for Single-Item Auction

| | |
|---|---|
| fade-up | fade-up |
| music loop is playing | Dvarjek House |
| it begins to fade out slowly as countdown gets to 6 seconds . . . | Semi-Annual Auction of Antique European Housewares |
| | Apr. 7, 2005 |
| | 3:00 PM CST |
| | Auction Begins In 8 Seconds |
| | 1 second fade-out as countdown hits 1 second (i.e. we never see 0 seconds) |
| Robust Renaissance Music Kicks in Strongly | against black |
| | Dvarjek House Logo treatment comes out |

-continued

| | |
|---|---|
| music ramps down underneath music | Semi-Annual Auction of |
| L: Good Afternoon everyone. My name is | Antique European Housewares |
| Lawrence Calicott. In behalf of Dvarjek House, | animates out in time with words |
| it is my pleasure to welcome you to our Semi- | |
| Annual Auction of Antique European | |
| Housewares. We have today 328 wonderful | |
| objects for sale. While most hail from Spain, | |
| France, Italy and the Netherlands, we also have a | |
| number of fascinating pieces from Russia, | |
| Prussia, and Austria. | |
| L: You can access today's catalog at any time by | Catalog button appears |
| pressing the Catalog button (sfx). Beside | |
| providing a detailed description of each item, it | |
| also contains all of our rules regarding bidding. | |
| L: If you're unable to stay with us today, you | You may place a proxy bid on any item |
| may place a proxy bid on any item directly from | directly from our catalog, at any point, |
| our catalog, at any point, up until the start of | up until the start of bidding on that item. |
| bidding on that item. | |
| L: Our auctioneer at Dvarjek House is Mr. | Auctioneer: Arthur Trenton |
| Arthur Trenton. | |
| A: Hello Everyone! | |
| L: Arthur, shall we get started? | |
| A: I think that's what everyone is here for, don't | |
| you think? | |
| L: Yes, I think so. Very good. Let's begin. | |
| music does a final cadence as . . . | screen clears . . . |
| OBJECT INTRODUCTION | Dvarjek House logo animates on |
| L: Our first auction is for Lot #1001. A set of | Lot #1001 |
| 10 French Crystal Goblets. | 10 French Crystal Goblets |
| sfx: elegant-soft | Large Photo of item "powder on" screen |
| | over logo. |
| | "Catalog" button is clearly visible (near |
| | image?) If selected, this would bring up |
| | a separate window with the catalog |
| | opened to the current item. |
| L: These are the last of a special order | The participant identifies that she is |
| manufactured by Bouchier in Grenoble . . . and | "ready to bid" while L is talking. |
| when you tap them with a salad fork ('ting' 'ting' | |
| 'ting') . . . mmmm . . . | |
| L: . . . even your crusty old uncle couldn't | Screen sets up for auction: image |
| possibly make a poor toast after such a good | shrinks slightly as auction arena |
| ring. Arthur . . . | becomes visible. Catalog button |
| | remains on screen (it is always on |
| | screen) |
| A: Thank you Lawrence. | There are 14 active bidders and about 48 |
| | people "just watching." At this point, |
| | 2 active bidders switch to "just |
| | watching," while 4 others switch to |
| | "ready to bid." |
| A: Allright, we'll start the bidding at $150 . . . | |
| ASK PRICE ON | $150 comes on screen |
| SFX: numberOn soft-slam | |
| A: 150-150-150 . . . going for $150 . . . | timer on $150 starts filling up |
| BID ATTEMPTS | bidder squares light up on screen, as |
| As Auctioneer continues . . . | bids roll in. |
| SFX: [5] light "bid attempt" hits under | |
| auctioneer's voice over 2 seconds of time. | |
| BID ATTEMPTS CONTINUE FOR 1.75 SECONDS | |
| AFTER FIRST BID IS RECEIVED BY SERVER. | |
| WINNER POPS UP | Winning bidder's cube pops up, as all |
| SFX: DING | other bid attempts return to grey. |
| this sound effect cuts off Auctioneer. | On winner's cube there is: |
| | icon face |
| | location icon (telephone, online, |
| | proxy or auction house) |
| | Info on winning bidder floats up above |
| | the winner's cube. |
| | screen name |
| | bid price |
| | paddle number |
| A: "We're off to a good start . . . " | $175 comes on screen |
| A: "$175 dollars" | |
| ASK PRICE ON | |
| A: " . . . 175 . . . 175 . . . 175" | timer on $175 starts filling up |
| BID ATTEMPTS [3] | (also another bidder becomes "ready to |
| | bid") |
| PARTICIPANT BID ATTEMPT | "EleonoraB" (that's the participant) rolls |
| SFX: Participant Bid | over icon (which responds to the roll- |
| works in among the Bid Attempt sfx, but | over) and clicks . . . which immediately |
| bigger. | lights up her icon, like the other bid |

| | |
|---|---|
| WINNER POPS UP<br>INDICATOR ON: Bid Speed<br>this comes on at the same time as winner pops up, there is no additional sfx. | attempts (but in green, in its central position & accompanied by a different and larger SFX)<br>EleonoraB does not win.<br>Since participant bid, the Indicator shows P her bid speed relative to winner's in milliseconds, with some kind of scale that indicating how close.<br><u>Sorry</u><br><u>win    you.</u><br><u>145    315</u> |
| A: Thank you.<br>A: $200<br>ASK PRICE ON<br>A: "... 200 ... 200 ... 200"<br>BID ATTEMPTS [4] | $200 comes on screen<br><br>timer on $200 starts filling up<br>even though bidders switch to "just watching" once the bidding has begun, there is no indication of this to others. New bidders can be added however. |
| PARTICIPANT BID ATTEMPT<br>SFX: Participant Bid<br>works in among the Bid Attempt sfx, but bigger<br>WINNER POPS UP<br><br>INDICATOR ON: Bid Speed<br>this comes on at the same time as winner pops up, there is no additional sfx. | EleonoraB does not win again, but is closer this time.<br>Since participant bid, the Indicator shows P her bid speed relative to winner's in milliseconds, with some kind of scale that indicating how close.<br><u>So close. Try again.</u><br><u>win    you.</u><br><u>153    172</u> |
| A: $225<br>ASK PRICE ON<br>A: "... 225 ... 225 ... 225"<br>BID ATTEMPTS<br>PARTICIPANT BID ATTEMPT<br>SFX: Participant Bid, 1 other bid attempt lights up immediately after Eleonora's.<br>PARTICIPANT WINNER POPS UP<br>SFX: DING-DING-DING! (similar to normal winner pop-up sfx, but more excited)<br>A: $240<br>ASK PRICE ON<br>A: "... 240 ... 240 ... 240"<br>BID ATTEMPTS [only 1 bidder at this time]<br>WINNER POPS UP<br>A: $250<br>ASK PRICE ON<br>A: "... 250 ... 250 ... 250"<br>There are no bid attempts.<br>(auctioneer stops his chant)<br>A: ANYbody for $250 ... $250 ... $250 ... | $225 comes on screen<br><br>timer on $225 starts filling up<br><br>EleonoraB tries again<br><br><br>EleonoraB wins this time.<br><br><br>$240 comes on screen<br><br>timer on $240 starts filling up<br><br><br>$250 comes on screen<br><br>timer on $250 starts filling up<br><br>Indicator On:<br>Only $25 more than your last bid.<br>Bid now if you want it.<br>timer on $250 fills up ... |
| A: Fair Warning ...<br>sfx: Fair Warning, accompanies title on screen<br><br>A: Lock Out & Stand-By ...<br>sfx: Lock-Out, accompanies title on screen, which leads into ...<br>sfx: 3 melodic beats in quick succession<br>A: Hammer sfx. "Sold ..." "... for $240." | FAIR WARNING<br>blinks on and off near the photo of the object<br>LOCK OUT & STAND BY<br>replaces "Fair Warning"<br><br><br>SOLD<br>Winner's Cube takes on "Auction Winner state," which shows all information, but bigger-more "permanent." |
| A: "Paddle GF7-" "ST1" "Congratulations to you."<br>L: Cheers! (sfx: clink) | the combination of two letters and a number twice yields over 45 million combinations (probably enough to allow everyone to register once and get their own unique permanent paddle number), while requiring only 13,440 audio files. |

| SFX/Music | Logo of Auction House spins out, takes over screen |
|---|---|
| L: Next up is Lot #1002. 18th Century Silverware. This set was used in the home of Monseignor Cornitreu in Paris. There are 14 complete settings in the box and . . . | Lot #1002<br>18th Century Silverware |
| fade-out | fade-out |

APPENDIX F

Sample Script for Dutch Auction

Welcome to Auction Sequence:
. . . introduce auctioneer (Arthur) . . .
S: Let's begin . . . and good luck everyone.

| | |
|---|---|
| L: Our first auction is for Lot #1001. A dutch auction for French Crystal Goblets. | Lot #1001 (on top of faded logo)<br>French Crystal Goblets<br>(w/Dutch Auction 'logo')<br>(top line then bottom) |
| sfx: elegant-soft | Large Photo of item "powder on" screen over logo |
| L: We have 35 of these lovely pieces available. They were manufactured by Bouchier in Grenoble . . . and when you tap them with a fork ('ting' 'ting' 'ting') . . . mmmm. Even your crusty old great uncle couldn't possibly make a poor toast after such a good ring. Arthur . . . | Available: 55 |
| A: Thank you Lydia. Please take a moment to confirm your Bid Quantities. | Screen sets up for auction |
| sfx: button click sfx's | Bid Quantities "flashes on" mouse changes bid quantities to Multiples: Min. 4-Desired 16, in 4's |
| A: Allright, we'll start the bidding at $50 a piece . . .<br>ASK PRICE ON<br>SFX: numberOn soft-slam | $50 comes on screen |
| A: 50-50-50 . . . going for $50 . . .<br>BID ATTEMPTS<br>As Auctioneer continues . . .<br>SFX: light "bid attempt" hits<br>as bidder icons pop on screen, as bids roll in.<br>Bid Attempts continue for X (5) seconds after first bid is received by server or Y (2) seconds after enough bids have been received to account for entire quantity. | timer on $50 starts filling up<br>icon-icon-icon pops on on top of the $50 ask price |
| WINNERS LIGHT UP<br>SFX: DING-ding-ding-ding<br>the first of these sound effects cut off A.<br>Since there can be, potentially, dozens of winners, therefore, if there is more than one winner, the duration of this event needs to be within a range of A to B seconds (1 to 3). Beyond the Threshold, it may be that more than 1 winner lights up at a time. | In quick succession, the icons of the Bid Winners "light up" in order or priority.<br>Priority at any one ask price is based upon:<br>▶First: Desired Quantity - highest quantities have priority and . . .<br>▶Secondly: Bid Speed - the fastest bids of equal quantities have priority |
| INDICATOR: STATUS<br>SFX: Status Slam (neutral slam) | A "sign" indicating the number winners out of total number of bidders pops on screen:<br>8 Bidders<br>5 Get In<br>This fades off screen as Winners go Into Box |
| WINNERS INTO BOX<br>SFX: "winner's slide" & quick 'stop'<br>for each winner, in quick succession.<br>Again, the duration of this event needs to happen within a range of C to D seconds, depending on the number of winners.<br>Beyond the Threshold, it may be that more than 1 winner flies into the box at a time. | Icons of Bid Winners, in priority order, fly up from their Bid Attempt location into their priority position within the Winner's Box. |
| LOSERS ON DECK<br>SFX: "loser's slide"<br>for each loser, in quick succession | Icons of Bid Losers, in priority order, fly away from their Bid Attempt location off screen right at the |

| | |
|---|---|
| Again, duraton of this event must fit within a range of E to F seconds, depending on number of losers.<br>Beyond the Threshold, it may be that more than 1 losers flies on deck at a time.<br>ASK PRICE ON<br>A: $75 dollars . . . 75 . . . 75 . . . 75<br>BID ATTEMPTS<br>PARTICIPANT BID ATTEMPT<br>SFX: Participant Bid<br>works in among the Bid Attempt sfx, but bigger. | position where the On Deck Bar slides out.<br><br><br>$75 comes on screen<br>timer on $75 starts filling up<br><br>"EleonoraB" (that's the participant) rolls over icon (which responds to the roll-over) and clicks . . . which immediately throws a representation of Eleonora up on screen as a Bid Attempt (but in green & accompanied by a different and larger SFX) |
| WINNERS LIGHT UP | Eleonora's green icon does not "light up" |
| INDICATOR: YOU'RE OUT<br>SFX: You're Out Slam (negative) | Since participant bid, the Winner Indicator shows whether she got in or not. And if not, why (beat on quantity, speed or both). In this case, Eleonora did not get in.<br>Sorry. You're Out.<br>You were beat on bid speed.<br>Try Again. |
| KNOCK OUT<br>SFX: Knock Out Slide (negative)<br>for each bid icon that is knocked out of the winner's box.<br>Duration of this event needs to happen within a range of G to H seconds, depending on the number of knock outs.<br>Beyond the Threshold, it may be that more than 1 knock out flies out of the box at a time.<br>WINNERS IN BOX<br>LOSERS ON DECK<br>SFX: numberOn soft-slam<br>A: $100 dollars . . . 100 . . . 100 . . . 100 | Icons of bids that get knocked out of Winner's box on account of price (not minimum quantity, if any) drop out of box and fly off screen right toward On Deck bar.<br><br><br><br><br>$100 comes on screen<br>timer on $100 starts filling up<br>"EleonoraB" (that us) rolls over icon and clicks again |
| sfx: bid attempts | Eleonora's green icon pops on screen with others (as it disappears from right side of screen) |
| SFX: pre-slap, then MAIN SLAP | 3 Bidders<br>All Get In |
| SFX: slide, POSITIVE sfx (stop) | "Dutch Ruler" slides into box, as it stops: 1. the price boxes pop on $100/$75/$50<br>2. You're In!<br>(For All 12) |
| SFX: numberOn soft-slam<br>A: $120 dollars . . . 120 . . . 120 . . . 120 | $120 comes on screen<br>timer on $120 starts filling up<br>"EleonoraB" (that us) rolls over icon and clicks again |
| sfx: 1 bid attempt<br>SFX: pre-slap, then MAIN SLAP | 2 Bidders<br>Both Get In |
| SFX: slide, POSITIVE sfx (stop) | "Dutch Ruler" slides into box, as it stops: 1. the price boxes pop on $120/$100/$75/$50<br>2. You're Still In<br>(for 8 out of 12) |
| SFX: numberOn soft-slam<br>A: $130-130-12- . . . going for $130 . . .<br>(auctioneer stops his chant)<br>A: ANYbody for $130 . . .<br>A: Fair Warning.<br>A: Lock Out & Stand-By<br>A: Hammer sfx. "Sold."<br>sfx: Happy Bell! | $130 comes on screen<br>timer on $130 starts filling up . . .<br>(no balls, timer is ¾ finished)<br>timer fills up all the way<br>FAIR WARNING . . . over the $120<br>Lock Out & Stand By<br>Sold.<br>You're a Winner!<br>8 items |
| A: Buying Price is $75 . . . by a nose. | $75 buying price - scales to front with re-enlarged picture of goblets. |
| SFX/Music | Logo of Auction House spins out, takes over screen |
| L: Next up is Lot #1002. . . . for ???????? . . . | Lot #1002 (on top of faded logo)<br>??????????????????<br>(top line then bottom) |
| fade-out | |

| Name | Example* | Scenerio |
|---|---|---|
| Status: Some | 8 Bidders<br>5 Get In | Participant doesn't bid. |
| Status: All | 7 Bidders<br>Everybody's In. | Participant doesn't bid. |
| Out: speed | Sorry. You're Out.<br>You were beat on bid speed.<br>Try Again. | Participant makes bid attempt and doesn't get in, such that:<br>1. There are other bids of same quantity that do get in.<br>2. But those bids are faster than participant's bid. |
| Out: quantity | Sorry. You're Out.<br>You were beat on quantity.<br>Try Again. | Participant makes bid attempt and doesn't get in, such that:<br>1. There are other bids of greater quantity that do get in<br>2. No others bid of equal quantity that get in, because participant's bid speed is faster. |
| Out: speed & quantity | Sorry. You're Out.<br>You were beat on both quantity and bid speed.<br>Try Again. | Participant makes bid attempt and doesn't get in, such that:<br>1. There are other bids of greater quantity that do get in<br>2. There are others bids of equal quantity that get in because their bid speed is faster. |
| In | You're In! | Participant makes bid attempt and gets in. |
| Snuck In | You Snuck In. | Participant makes bid attempt and gets in, such that:<br>1. There is a quantity of at least 5 items<br>2. Not all bid attempts were successful<br>3. There are more than 4 bidders in the Winner's box<br>4. Participant's bid attempt is successful<br>5. Because of Participant's priority, the quantity that the Participant can claim is in the bottom 15% of total quantity available. |
| Still In | You're Still In! | Participant's bid remains in Winner's Box after subsequent ask prices. |
| Still In Barely | You're still in . . . but barely. | Participant's bid remains in Winner's Box after subsequent ask prices, such that:<br>1. the quantity that Participant can claim is in the bottom 15% of total quantity available. |
| Knock Out: standard | You're Knocked Out.<br>Try Again. | Participant's bid is knocked out of Winner's box to make room for bids of higher priority. |
| Knock Out: high minimum | You're Knocked Out.<br>Can't meet your minimum quantity.<br>Try Again. | Participant's bid is knocked out of Winner's box, because the priority order of the bid makes it the lowest in the winner's box, but the quantity available to claim by the participant is less than her minimum required. |
| Resurrected. | You're Resurrected!<br>There aren't enough items to meet the lowest bidders minimum quantity. So now there's room for you. | Participant's bid was On Deck, but goes back into Winner's box because there are not enough items available to meet the lowest bidder's minimum quantity. |

*Text subject to generic versioning

What is claimed is:

1. A method for providing an auction of a plurality of similar items, the method comprising:

(a) announcing an ask price for each of a plurality of similar items in an auction;

(b) receiving a bid from at least one of a plurality of bidders, each bid comprising an identification of a desired quantity of the item;

(c) determining a priority order for a plurality of bids received in (b);

(d) automatically determining, by at least one processor, one or both of the following if a sum of desired quantities for the plurality of bids received in (b) is greater than a total number of items available: (1) which of the plurality of bidders are currently winning the auction based on the priority order and (2) which of the plurality of bidders are currently losing the auction based on the priority order;

(e) informing the plurality of bidders of a result of (d);

(f) incrementing the ask price; and (g) repeating (a)-(f) until no bids are received for the ask price, wherein the auction does not have a scheduled end time, wherein each bid further comprises an acceptable minimum quantity of the item, and wherein (d) comprises automatically determining which of the plurality of bidders is currently winning his desired quantity of the item and which of the plurality of bidders is currently winning at a quantity less than his desired quantity but greater than or equal to his acceptable minimum quantity, the step of automatically determining which of the plurality of bidders is currently winning his desired quantity of the item and which of the plurality of bidders is currently winning at a quantity less than his desired quantity but greater than or equal to his acceptable minimum quantity comprising:

(d1) for a bid of the highest priority, allocating its desired quantity of the item;

(d2) for a bid of the next highest priority:

(i) if there are enough unallocated items, allocating its desired quantity of the item;

(ii) if there are not enough unallocated items to satisfy its desired quantity of the item but there are enough unallocated items to satisfy its minimum quantity, allocating the unallocated items to the bid; and (iii) if there are not enough unallocated items to satisfy its desired quantity of the item and there are not enough unallocated items to satisfy its minimum quantity, allocating no items to the bid.

2. The method of claim 1, wherein bids with largest desired quantities have highest priority among bidders who have bid at the highest ask price.

3. The method of claim 2, wherein, if two or more bidders have equal desired quantities, bidders with fastest bid times have highest priority.

4. The method of claim 1, wherein the bid in (d2)(iii) maintains its priority order according to bid price, desired quantity, and bid time.

5. The method of claim 1 further comprising performing (d2)(i)-(iii) for each bid of a next highest priority until there are either no unallocated items remaining or no bids remaining.

6. The method of claim 1 further comprising automatically determining, if a sum of desired quantities for the plurality of bids received in (b) is less than a total number of items available, that each of the plurality of bidders is currently winning his desired quantity of the item.

7. The method of claim 1, wherein (g) comprises repeating (a)-(f) until no bids are received within a period of time for the ask price.

8. The method of claim 1, wherein bids are received in (b) from a respective plurality of peripherals in communication with the at least one processor.

9. A system for providing an auction of a plurality of similar items, the system comprising:

a processor; and a non-transitory computer readable storage medium having stored therein data representing instructions executable by the processor for performing the steps of:

(a) announcing an ask price for each of a plurality of similar items in an auction;

(b) receiving a bid from at least one of a plurality of bidders, each bid comprising an identification of a desired quantity of the item;

(c) determining a priority order for a plurality of bids received in (b);

(d) automatically determining one or both of the following if a sum of desired quantities for the plurality of bids received in (b) is greater than a total number of items available: (1) which of the plurality of bidders are currently winning the auction based on the priority order and (2) which of the plurality of bidders are currently losing the auction based on the priority order;

(e) informing the plurality of bidders of a result of (d);

(f) incrementing the ask price; and (g) repeating (a)-(f) until no bids are received for the ask price, wherein the auction does not have a scheduled end time, wherein each bid further comprises an acceptable minimum quantity of the item, and wherein (d) comprises automatically determining which of the plurality of bidders is currently winning his desired quantity of the item and which of the plurality of bidders is currently winning at a quantity less than his desired quantity but greater than or equal to his acceptable minimum quantity, the step of automatically determining which of the plurality of bidders is currently winning his desired quantity of the item and which of the plurality of bidders is currently winning at a quantity less than his desired quantity but greater than or equal to his acceptable minimum quantity comprising:

(d1) for a bid of the highest priority, allocating its desired quantity of the item;

(d2) for a bid of the next highest priority:

(i) if there are enough unallocated items, allocating its desired quantity of the item;

(ii) if there are not enough unallocated items to satisfy its desired quantity of the item but there are enough unallocated items to satisfy its minimum quantity, allocating the unallocated items to the bid; and (iii) if there are not enough unallocated items to satisfy its desired quantity of the item and there are not enough unallocated items to satisfy its minimum quantity, allocating no items to the bid.

10. The system of claim 9, wherein bids with largest desired quantities have highest priority among bidders who have bid at the highest ask price.

11. The system of claim 10, wherein, if two or more bidders have equal desired quantities, bidders with fastest bid times have highest priority.

12. The system of claim 9, wherein the bid in (d2)(iii) maintains its priority order according to bid price, desired quantity, and bid time.

13. The system of claim 9 further comprising performing (d2)(i)-(iii) for each bid of a next highest priority until there are either no unallocated items remaining or no bids remaining.

14. The system of claim 9 further comprising automatically determining, if a sum of desired quantities for the plurality of bids received in (b) is less than a total number of items available, that each of the plurality of bidders is currently winning his desired quantity of the item.

15. The system of claim 9, wherein (g) comprises repeating (a)-(f) until no bids are received within a period of time for the ask price.

16. The system of claim 9, wherein bids are received in (b) from a respective plurality of peripherals in communication with the processor.

* * * * *